(12) United States Patent
Suzuki

(10) Patent No.: US 9,511,709 B2
(45) Date of Patent: Dec. 6, 2016

(54) VEHICLE TURN CANCEL SIGNAL OUTPUT DEVICE

(71) Applicant: YAZAKI CORPORATION, Tokyo (JP)

(72) Inventor: Norihito Suzuki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/654,770

(22) PCT Filed: Dec. 19, 2013

(86) PCT No.: PCT/JP2013/084157
§ 371 (c)(1),
(2) Date: Jun. 22, 2015

(87) PCT Pub. No.: WO2014/103895
PCT Pub. Date: Jul. 3, 2014

(65) Prior Publication Data
US 2015/0336505 A1 Nov. 26, 2015

(30) Foreign Application Priority Data

Dec. 26, 2012 (JP) .................................. 2012-283569

(51) Int. Cl.
*B60Q 1/40* (2006.01)
(52) U.S. Cl.
CPC ...................................... *B60Q 1/40* (2013.01)
(58) Field of Classification Search
CPC ............ B60Q 1/40; B60Q 1/42; B62D 5/0466
USPC .......................................................... 340/476
See application file for complete search history.

(56) References Cited

U.S. PATENT DOCUMENTS

| 5,839,537 | A | * | 11/1998 | Nishino | ............... | B62D 5/0466 |
|---|---|---|---|---|---|---|
| | | | | | | 180/443 |
| 2004/0100373 | A1 | * | 5/2004 | Ponziani | .................. | B60Q 1/40 |
| | | | | | | 340/476 |
| 2005/0200467 | A1 | * | 9/2005 | Au | ........................... | B60Q 1/34 |
| | | | | | | 340/465 |
| 2010/0308988 | A1 | * | 12/2010 | Ieda | ........................ | B60Q 1/40 |
| | | | | | | 340/477 |

FOREIGN PATENT DOCUMENTS

| JP | 2002-19631 A | 1/2002 |
|---|---|---|
| JP | 2005-35343 A | 2/2005 |
| JP | 2010-285052 A | 12/2010 |

(Continued)

OTHER PUBLICATIONS

International Preliminary Report on Patentability and English language Written Opinion of the International Search Report for PCT/JP2013/084157.

(Continued)

*Primary Examiner* — Don N Vo
(74) *Attorney, Agent, or Firm* — Kenealy & Vaidya LLP

(57) ABSTRACT

The vehicle turn cancel signal output device is provided with a steering angle detector; a first cancel pulse generator that generates a first cancel pulse when reaching a steering angle to be detected as an edge indicating termination of turning of a vehicle based on the detected steering angle, a second cancel pulse generator that generates a second cancel pulse indicating a rotation direction of steering based on the detected steering angle; and signal output terminals.

4 Claims, 14 Drawing Sheets

(56) References Cited

FOREIGN PATENT DOCUMENTS

| | | |
|---|---|---|
| JP | 2011-88480 A | 5/2011 |
| JP | 2011-131631 A | 7/2011 |

OTHER PUBLICATIONS

International Search Report and Written Opinion of the International Search Report for PCT/JP2013/084157 dated Feb. 18, 2014.

* cited by examiner

| Case | \|SPEED STRG\| [°/sec] | ANG C/E | | |
|---|---|---|---|---|
| | | befor offset [°] | offset value [°] | after offset [°] |
| 1 | 0 | 30 | −25 | 5 |
| 2 | 25 | | −23 | 8 |
| 3 | 50 | | −20 | 10 |
| 4 | 75 | | −18 | 13 |
| 5 | 100 | | −15 | 15 |
| 6 | 125 | | −13 | 18 |
| 7 | 150 | | −10 | 20 |
| 8 | 175 | | −8 | 23 |
| 9 | 200 | | −5 | 25 |
| 10 | 225 | | −3 | 28 |
| 11 | ≧250 | | 0 | 30 |

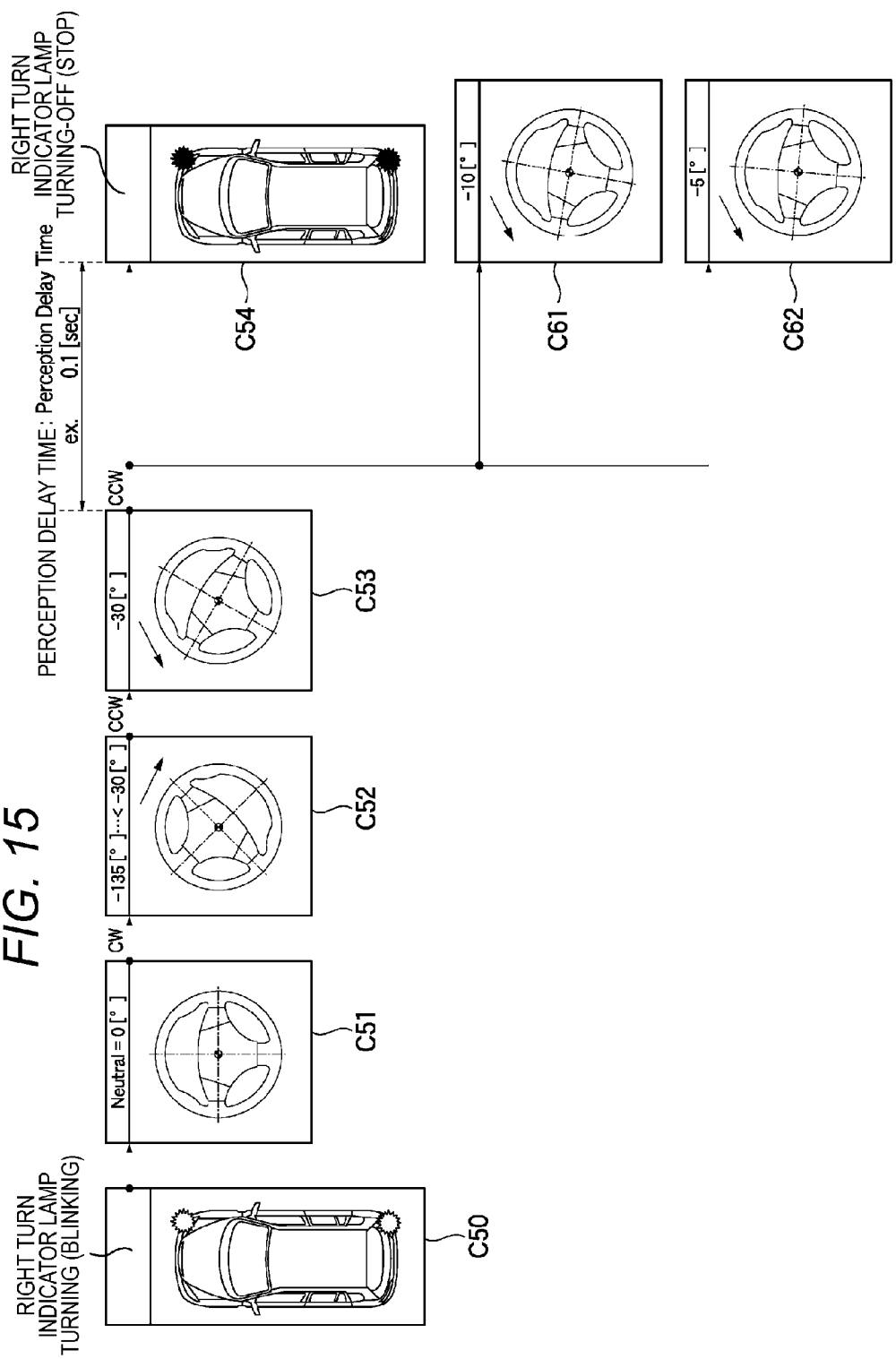

VEHICLE TURN CANCEL SIGNAL OUTPUT DEVICE

TECHNICAL FIELD

The present invention relates to a vehicle turn cancel signal output device that generates a turn cancel signal for giving a trigger for releasing an operation state of a turn indicator mounted in a vehicle based on an operational state of a steering wheel of the vehicle.

BACKGROUND ART

For example, when a vehicle moves to an adjacent travel lane on a road where plural travel lanes are present (lane change), or when the vehicle turns right or left at an intersection to change a route (turn), it is necessary to give a turn indication signal so that a driver of another vehicle can recognize the lane change or the turn.

In order to give such a turn indication signal, turn signal lamps are provided as turn indicators (blinkers) in the vehicle. Further, as a driver operates an operation lever provided in the vicinity of a steering wheel of the vehicle, the turn signal lamp provided on a right side or a left side of a vehicle body can blink.

In the case of the lane change, before changing the lane, it is necessary that the turn signal lamp blinks for several seconds so that the driver of another vehicle can recognize the lane change. Further, in the case of the turn, it is necessary that blinking of the turn signal lamp be maintained until the turn is terminated.

In a general vehicle, an operation lever for switching an operation of a turn indicator has two-stage operation positions. For example, when a driver applies a force to the operation lever to slightly tilt the lever (first-stage position), a turn signal lamp blinks while the force is being applied to retain the lever. That is, if the force applied to retain the lever is released, the lever returns to a predetermined neutral position by a force of a spring, so that the blinking of the turn signal lamp is terminated. On the other hand, when the driver applies a force to the lever to greatly tilt the lever (second-stage position), the position of the lever is mechanically retained, and even though the driver releases the force applied to the lever, the turn signal lamp maintains the blinking state. Further, a mechanism for mechanically detecting a steering state of a steering wheel is provided, and when the steering is terminated, the retention of the operation lever is automatically released.

Accordingly, in normal driving, in the case of the lane change, the driver uses the first-stage position of the operation lever, and in the case of the right turn or the left turn, the driver uses the second-stage position of the operation lever. By using the second-stage position, when the right turn or the left turn based on the rotation of the steering wheel is being performed, it is not necessary to continuously apply the force for retaining the operation lever, and thus, the driving operation becomes comfortable. Further, in the right turn or left turn, if the turn is terminated, since the state is mechanically detected so that the operation lever automatically returns to the neutral position, the driver does not need to perform a special operation for terminating the blinking of the turn signal lamp.

As such a device that controls blinking of the turn signal lamp, an electronic control device that employs a sensor for detecting a steering angle is known, as disclosed in PTL 1 to PTL 3, for example.

PTL 1 discloses the following technique. An automatic return lever switch and a steering angle sensor for detecting a rotation direction and an angle of a steering wheel are connected to control means, and the control means outputs a predetermined turning signal based on an operation signal of the lever switch. Further, a turn signal lamp blinks by the turning signal, and a rotation position of steering is detected by the steering angle sensor. Further, during straightforward travelling, the output of the turning signal is stopped, and the turn signal lamp is turned off.

PTL 2 discloses a technique for automatically turning off a turn signal at a suitable timing in a lane change. Specifically, a yaw rate sensor and a steering angle sensor are mounted, and when an initial velocity is in a high speed range, determination of a turning-off condition is performed based on a yaw rate detection signal with high reliability of a detection result during high speed traveling, and when the initial velocity is in a low speed range, the determination the turning-off condition is performed based on a steering angle detection signal with high reliability of a detection result during low speed traveling.

PTL 3 discloses a technique for preventing erroneous turning-off of a turn signal during right or left turn. Specifically, a turning-off condition is switched by automatically distinguishing right or left turn from lane change based on whether a steering angle of a steering angle sensor reaches a cancel preparation angle.

Further, PTL 4 discloses a conventional technique relating to a power steering device of a vehicle, which has no relation to blinking of a turn signal lamp. PTL 4 uses a steering angle detected by a steering angle sensor and a vehicle velocity detected by a vehicle speed sensor. Specifically, it is determined whether a steering wheel is in a turn increase state or in a return state from the detected steering angle. Further, a steering reaction force instruction value having a hysteresis characteristic is calculated with respect to the steering angle based on the steering angle and the vehicle speed, and an actuator such as a motor is drive-controlled so that a steering reaction force corresponding to the steering reaction force instruction value acts on the steering wheel.

CITATION LIST

Patent Literature

[PTL 1] JP-A-2005-035343
[PTL 2] JP-A-2011-088480
[PTL 3] JP-A-2011-0131631
[PTL 4] JP-A-2002-019631

SUMMARY OF INVENTION

Technical Problem

As disclosed in PTL 1 to PTL 3, a technique in which an electronic control unit (ECU) that controls a turn signal lamp identifies a lamp turning-off (turn cancel) condition using a steering angle sensor that detects a rotation angle of steering is known in the related art.

However, generally, the electronic control unit (ECU) should execute various controls in addition to blinking and turning-off of the turn signal lamp. However, in order to identify the turn cancel condition with high accuracy, the electronic control unit (ECU) should monitor the steering angle detected by the steering angle sensor at a short time cycle, and should frequently repeat comparison of conditions. For that reason, if the conditions for identifying the turn cancel are complicated, the burden of the electronic control unit (ECU) relating to the control of the turn signal lamp increases, and the entire control may not be processed within a predetermined time. Accordingly, it is necessary to mount a high performance computer in the electronic control unit (ECU), which causes remarkable increase in cost.

Further, the identification of the turn cancel condition causes the following problems, for example.

For example, in the case of a large-sized vehicle such as a truck or a bus, a rotatable range of the steering wheel reaches several turns. Accordingly, if an absolute angle detected by the steering angle sensor is identified only in an angle range of 0° to 360°, when the steering wheel rotates n times (n×360° turns) according to right turn or left turn of the vehicle, a state that matches the condition occurs n times. As a result, the turn cancel is detected at a timing which the driver does not desire (in the middle of the turn), so that the turn signal lamp is controlled to be turned off.

Further, for example, in the case of the large-sized vehicle such as a truck or a bus, since the entire length of the vehicle body is long, when the vehicle turns left at an intersection of a narrow road (when the vehicle travels on a left side of the road), the driver should perform a driving operation of first slightly turning the steering wheel to the right and then greatly turning the steering wheel to the left for the left turn. In such a case, if the identification condition of the turn cancel is not appropriate, when the steering wheel returns to the vicinity of a neutral position while turning the steering wheel to the right and then to the left (when the left turn starts), the turn cancel is detected, so that the turn signal lamp is controlled to be turned off Further, the relationship between the rotation angle of the steering wheel and a steering angle of a vehicle wheel is greatly different between a general passenger car and a large-sized vehicle. Further, an appropriate condition for identifying the turn cancel may also be different according to models of vehicles. Thus, it is difficult to commonly use an electronic control unit (ECU) that controls a turn signal lamp for various models. Due to such a restriction, it is difficult to reduce the cost of the electronic control unit (ECU).

Further, even when the turning-off of the turn signal lamp is controlled by the method disclosed in PTL 1 to PTL 3, similarly, a timing when the turn signal lamp is turned off is a timing when the rotation position of the steering wheel returns to a predetermined position (steering angle). On the other hand, the driver may feel discomfort due to a difference between an actual steering situation and the timing when the turn signal lamp is turned off. Specifically, the following situations will be described as examples.

It is assumed that the driver perceives the turning-off of the turn signal lamp by turning-off of a turn indicator display lamp on a meter unit or silencing of operational noise of a relay that controls electrification of blinking of the turn signal lamp. Further, here, it is assumed that the device on the vehicle side automatically lights off the turn signal lamp at a steering angle in a state where the steering wheel returns to a position of an angle of 30° before the neutral position.

During right turn, left turn or the like, when the driver operates the steering wheel at a relatively low speed to return to the neutral position in a state where the turn signal lamp blinks, the driver may feel as follows. That is, when the driver perceives the turning-off of the turn signal lamp, the driver feels that the turning-off operation is too early. In other words, the driver feels that the turn signal lamp is arbitrarily turned off even though the steering wheel returns to only the angle of about 30° before the neutral position and the right or left turn is not completed. Further, since signaling using the turn signal lamp is not performed in straightforward travelling, the driver feels unsafe about whether a following vehicle, an oncoming vehicle or the like recognizes that the host vehicle is turning right or left.

On the other hand, during right turn, left turn or the like, when the driver operates the steering wheel at a relatively high speed to return to the neutral position in a state where the turn signal lamp blinks, the driver does not particularly feel discomfort. That is, even though the turn signal lamp is turned off when the steering wheel returns to the angle of about 30° before the neutral position, when the driver perceives the turning-off of the turn signal lamp, the steering wheel already returns approximately to the neutral position. Accordingly, the driver feels that the turn signal lamp is turned off at approximately the same time with the completion of the right or left turn, and thus, the driver does not feel discomfort or unsafe.

Here, if the steering angle when the turn signal lamp is automatically turned off is changed to an angle closer to the neutral position compared with the angle of 30°, the situation is changed as follows. That is, when the driver operates the steering wheel at a relatively low speed to return to the neutral position, a feeling of discomfort or unsafe is relieved. On the other hand, when the driver operates the steering wheel at a relatively high speed to return to the neutral position, the driver feels discomfort. That is, even though the steering wheel already returns to the neutral position and the right or left turn is completed, blinking of the turn signal lamp is continued, causing the driver to feel that it takes an excessively long time until the turn signal lamp is turned off.

In order to solve the above-described problems, an object of the invention is to provide a vehicle turn cancel signal output device that relieves discomfort that the driver feels during right or left turn.

Solution to Problem

In order to achieve the above-described object, the vehicle turn cancel signal output device according to the invention has the following characteristics (1) to (5).

(1) A vehicle turn cancel signal output device that generates a turn cancel signal for giving a trigger for releasing an operation state of a turn indicator mounted on a vehicle based on an operation state of a steering wheel of the vehicle, includes: a steering angle detector that detects a steering angle of the steering wheel; a steering angular velocity detector that detects a steering angular velocity based on the detected steering angle; a first cancel pulse generator that generates a first cancel pulse when the steering angle reaches a target edge steering angle to be detected as an edge indicating termination of turning of the vehicle, based on the steering angle detected by the steering angle detector, and corrects the target edge steering angle according to the magnitude of the steering angular velocity; a second cancel pulse generator that generates a second cancel pulse indicating a rotation direction of steering based on the steering angle detected by the steering angle detector; and a signal output terminal that outputs a signal in which at least one of a state of the first cancel pulse and a state of the second cancel pulse is reflected.

(2) The vehicle turn cancel signal output device having the configuration of (1) further includes a memory that retains information on at least one parameter that affects a condition of generating the first cancel pulse.

(3) In the vehicle turn cancel signal output device having the configuration of (2), the memory retains a first parameter indicating a reference value of the target edge steering angle for generating the first cancel pulse and a second parameter indicating a perception delay time, and the first cancel pulse generator corrects the target edge steering angle using a multiplication result of the detected steering angular velocity and the second parameter.

(4) In the vehicle turn cancel signal output device of the configuration of (3), the first cancel pulse generator performs the correction of the target edge steering angle depending on the steering angular velocity when an absolute value of the steering angular velocity is within a predetermined threshold value.

(5) In the vehicle turn cancel signal output device of the configuration of (3), the memory retains a third parameter indicating a minimum value of the target edge steering angle, and the first cancel pulse generator maintains the absolute value of the target edge steering angle after correction to be equal to or larger than a value of the third parameter.

According to the vehicle turn cancel signal output device having the configuration of (1), the target edge steering angle can be automatically corrected so as to reflect the magnitude of the steering angular velocity. Accordingly, even when the operation speed of the steering wheel is changed according to an actual driving situation, it is possible to generate the turn cancel signal at an appropriate timing when the driver does not feel discomfort or unsafe.

According to the vehicle turn cancel signal output device having the configuration of (2), the condition for detecting the turn cancel can be determined by the parameters retained in the memory. Accordingly, it is possible to take appropriate measures for different models of vehicles by only changing the parameters.

According to the vehicle turn cancel signal output device having the configuration of (3), in consideration of a perception delay time indicating internal delay of the device from the time when the turn signal lamp is turned off to the time when the state is perceived by the driver or perception delay of the driver, it is possible to generate the turn cancel signal at an appropriate timing even when the steering angular velocity is changed.

According to the vehicle turn cancel signal output device having the configuration of (4), in a range where the difference of the steering angular velocity affects a timing when the driver perceives the turning-off of the turn signal lamp, for example, in a case where the driver operates the steering wheel at a relatively low speed, it is possible to appropriately correct the target edge steering angle.

According to the vehicle turn cancel signal output device having the configuration of (5), it is possible to generate the turn cancel signal before the steering wheel returns to the complete neutral position. Accordingly, even when there is an affect due to play that is present in a steering mechanism, shift of the neutral position of the steering wheel, or shift of an installation position of the steering angle sensor, it is possible to reliably generate the turn cancel signal when the right or left turn is terminated.

Advantageous Effects of Invention

According to the vehicle turn cancel signal output device of the invention, it is possible to relieve discomfort that the driver feels during right or left turn.

Hereinbefore, the invention has been briefly described. Further, details of the invention will be more apparent by description of embodiments for realizing the invention to be described hereinbelow (hereinafter, referred to as "embodiments") with reference to the accompanying drawings.

BRIEF DESCRIPTION OF DRAWINGS

FIG. 15 is a state transition diagram illustrating a specific example of the correspondence relationship between state transition of a steering angle and a rotation direction depending on an operation of a steering wheel and control of a turn indicator lamp.

DESCRIPTION OF EMBODIMENTS

A specific embodiment relating to a vehicle turn cancel signal output device of the invention is described herein with reference to the accompanying drawings.

<Outline of Vehicle Turn Cancel Signal Output Device>

Figure 2:
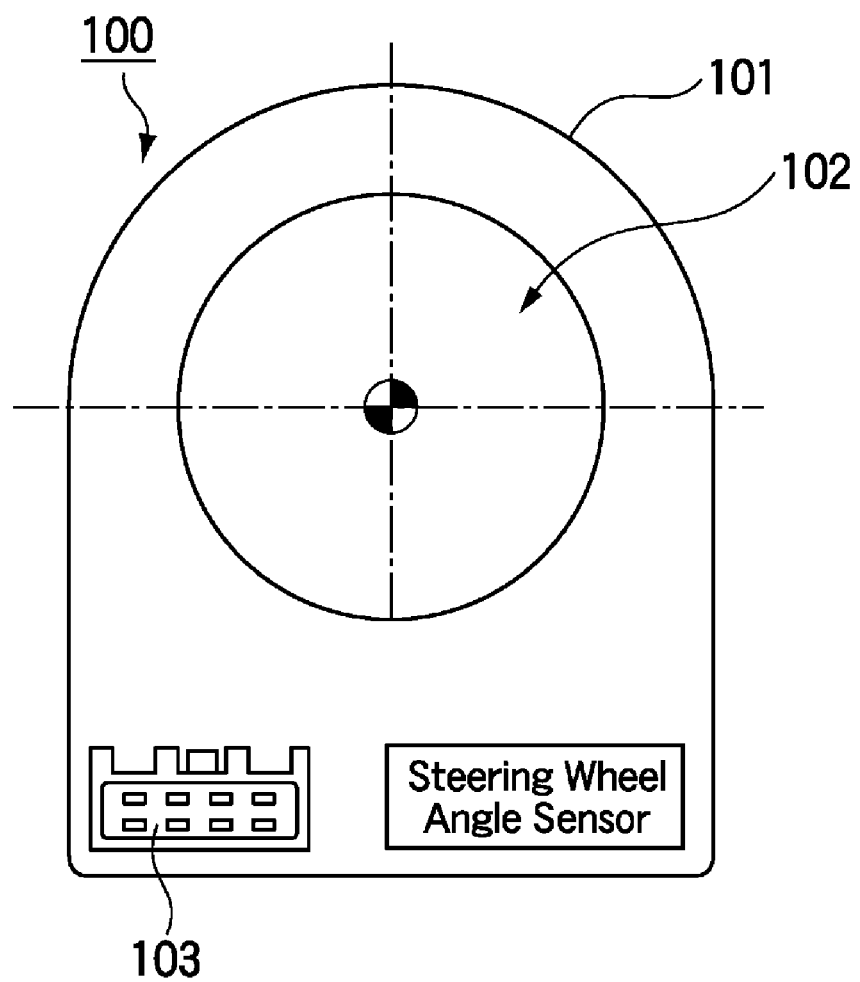
FIG. 2 is a front view illustrating an appearance of a turn cancel signal output device.

A vehicle turn cancel signal output device of the invention is integrally formed in a form shown in FIG. 2 so that the vehicle turn cancel signal output device can be used as a substitute of a steering angle sensor for general steering mounted on a vehicle, for example.

Further, the vehicle turn cancel signal output device can output information on a steering angle, similar to the general steering angle sensor. In addition, the vehicle turn cancel signal output device is installed with a function of outputting a special turn cancel signal (corresponding to C/P-1 or C/P-2 in FIG. 1) in addition to the steering angle.

In a vehicle, as a driver operates a specific operation lever disposed in the vicinity of a steering wheel (handle), a turn signal for right turn, left turn, lane change or the like of the vehicle is generated. According to the turn signal, an electronic control unit (ECU) on the vehicle blinks a turn signal lamp of a turn indicator.

In the case of lane changing, as the driver releases a force applied to the operation lever, the turn signal is released, and thus, blinking of the turn signal lamp is terminated using the release of the turn signal as a trigger. On the other hand, in the case of right turn or left turn, since it is necessary to continue blinking of the turn signal lamp until the turn of the vehicle is actually terminated, even though the driver releases the force applied to the operation level, the turn signal is self-maintained in an ON state.

Accordingly, in the case of right turn or left turn, it is necessary to automatically identify the state where the turn of the vehicle is terminated to terminate blinking of the turn signal lamp. The electronic control unit (ECU) is able to monitor information on a steering angle detected by a sensor, to automatically identify the state where the turn of the vehicle is terminated.

However, when employing the vehicle turn cancel signal output device of the invention, the electronic control unit (ECU) can detect the state where the turn of the vehicle is terminated by a simple process based on the turn cancel signal, compared with a case where the steering angle is monitored.

<Description of Main Functional Configuration>

Figure 1:
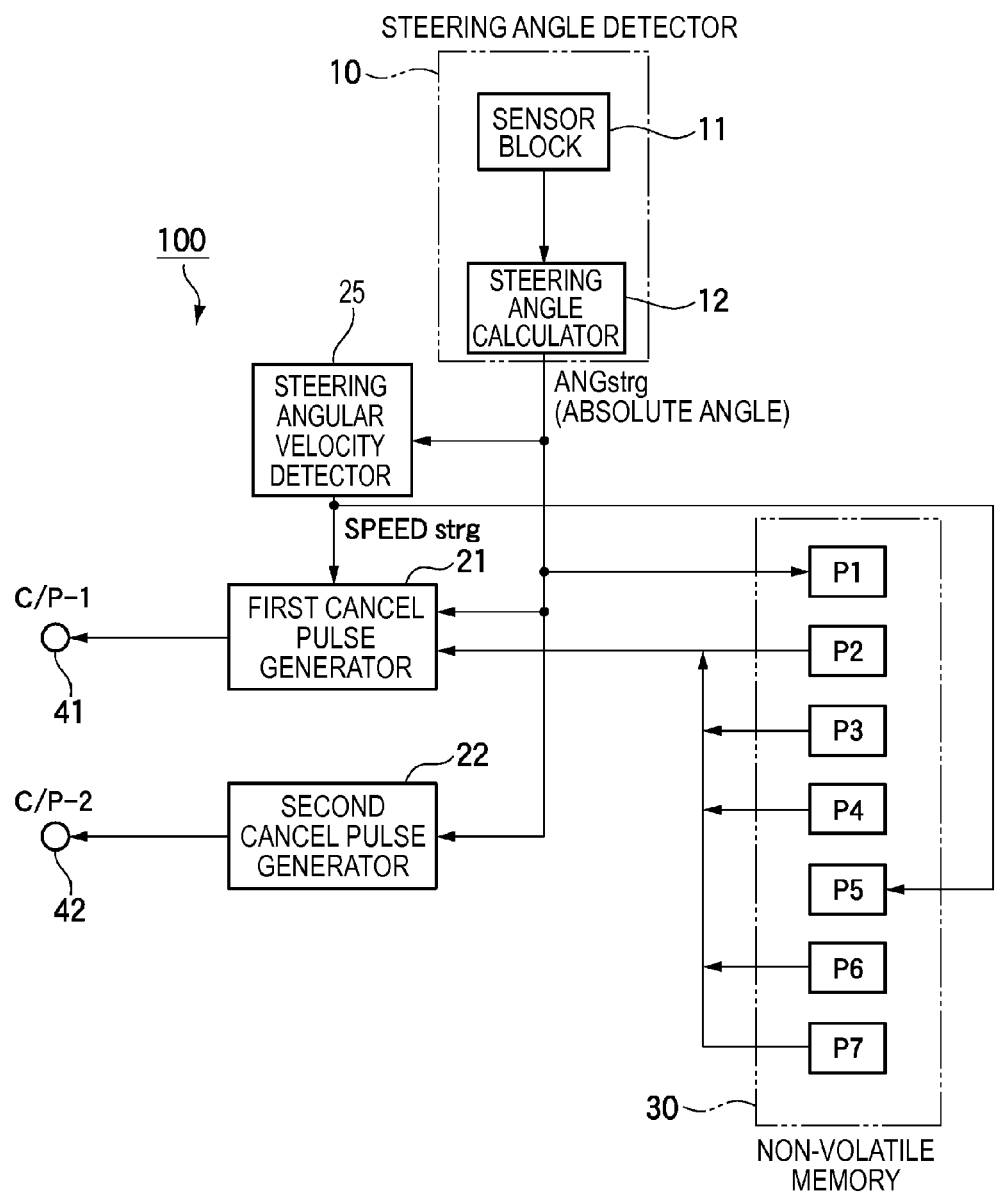
FIG. 1 is a block diagram illustrating a functional configuration relating to main parts of a turn cancel signal output device.

A functional configuration relating to main parts of a turn cancel signal output device 100 is shown in FIG. 1.

The vehicle turn cancel signal output device 100 includes a steering angle detector 10, a first cancel pulse generator 21, a second cancel pulse generator 22, a steering angular velocity detector 25, a non-volatile memory 30, and output terminals 41 and 42.

The steering angle detector 10 includes a sensor block 11 and a steering angle calculator 12. The sensor block 11 may detect a rotation angle using a rotational position of a steering rotating shaft of a vehicle as a detection target. That is, the sensor block 11 may detect the rotation angle of the steering wheel with respect to a neutral position. A detection principle of the sensor block 11 uses the same technique as that in a commercially available steering angle sensor in the related art.

The steering angle calculator 12 may perform an arithmetic operation with respect to an electric signal output by the sensor block 11 to successively output information on a latest steering angle ANGstrg [°].

The steering angular velocity detector 25 may monitor the steering angle ANGstrg output from the steering angle detector 10 to output a change velocity thereof as a steering angular velocity SPEEDstrg [°/sec]. The information on the steering angular velocity SPEEDstrg is input to the first cancel pulse generator 21.

The first cancel pulse generator 21 has a function of generating a first cancel pulse C/P-1 based on the steering angle ANGstrg output from the steering angle detector 10 and respective parameters P2 to P5 retained in the non-volatile memory 30. Further, the first cancel pulse generator 21 automatically corrects a timing (angle) when the first cancel pulse C/P-1 is generated using the steering angular velocity SPEEDstrg input from the steering angular velocity detector 25. The first cancel pulse C/P-1 represents whether the steering angle reaches a steering angle to be detected as an edge indicating termination of the turn of the vehicle.

The second cancel pulse generator 22 has a function of generating a second cancel pulse C/P-2 based on the steering angle ANGstrg output from the steering angle detector 10. The second cancel pulse C/P-2 represents the rotation direction of the steering shaft.

The non-volatile memory 30 may retain data on each of the following parameters P1 to P7. Content of these parameters may be rewritten.

P1: Steering angle ANGstrg detected by steering angle detector 10

P2: Cancel edge angle value

P3: Hysteresis angle value (fine angle for providing a hysteresis characteristic)

P4: Cancel mode designation (any one of single and multi)

P5: Steering angular velocity SPEEDstrg detected by steering angular velocity detector 25

P6: Perception delay time (TIME-P/D)

P7: Cancel target angle (ANGc/t)

The perception delay time (TIME-P/D) has the following meaning. That is, the perception delay time (TIME-P/D) represents a time lag from the time when blinking of the turn signal lamp is terminated according to the turn cancel signal (C/P-1 or C/P-2) output by the turn cancel signal output device 100 to the time when the driver actually perceives the termination. Specifically, the perception delay time includes an internal delay time of the device from the time when blinking of the turn signal lamp is terminated to the time when the termination is reflected to stop of a display or relay operation, and a necessary perception time until the driver perceives change in display or operation sound. As a specific example of the perception delay time, a constant of 0.1 (sec) may be used.

The first cancel pulse C/P-1 generated by the first cancel pulse generator 21 is output to the output terminal 41, and the second cancel pulse C/P-2 generated by the second cancel pulse generator 22 is output to the output terminal 42.

The higher electronic control unit (ECU) that controls the turn indicator or the like can detect termination of the turn of the vehicle by only simple processing with reference to C/P-1 and C/P-2 output from the output terminals 41 and 42 of the turn cancel signal output device 100. If the termination of the turn is detected, the electronic control unit (ECU) terminates blinking of the turn signal lamp using the detection as a trigger.

When the function corresponding to the operation of the steering angular velocity detector 25 is built in the steering angle detector 10, the information on the steering angular velocity output from the steering angle detector 10 may be input to the first cancel pulse generator 21 without installation of the steering angle detector 25.

<Description of Appearance>

A specific example of an appearance of the turn cancel signal output device 100 is shown in FIG. 2. As shown in FIG. 2, a main body of the turn cancel signal output device 100 is disposed inside a housing 101.

A circular opening portion 102 and a connector 103 are provided in the housing 101. The diameter of the opening portion 102 has the same size as the appearance of the rotating shaft that supports the steering wheel of the vehicle. That is, in a state where the rotation shaft passes through the opening portion 102 of the turn cancel signal output device 100, the turn cancel signal output device 100 may be fixed to the vehicle.

The sensor block 11 shown in FIG. 1 may detect a rotation amount of the rotating shaft disposed in the opening portion 102 of the turn cancel signal output device 100. The steering angle calculator 12 calculates the rotation angle of the steering wheel based on the rotation amount.

As shown in FIG. 2, multiple terminals are provided in the connector 103 disposed in an outer part of the housing 101. The output terminals 41 and 42 shown in FIG. 1 are included in these terminals. That is, the higher electronic control unit (ECU) that controls the turn indicator or the like may be connected to the turn cancel signal output device 100 through the connector 103, and may refer to C/P-1 and C/P-2.

<Description of Configuration of Electric Circuit>

Figure 3:
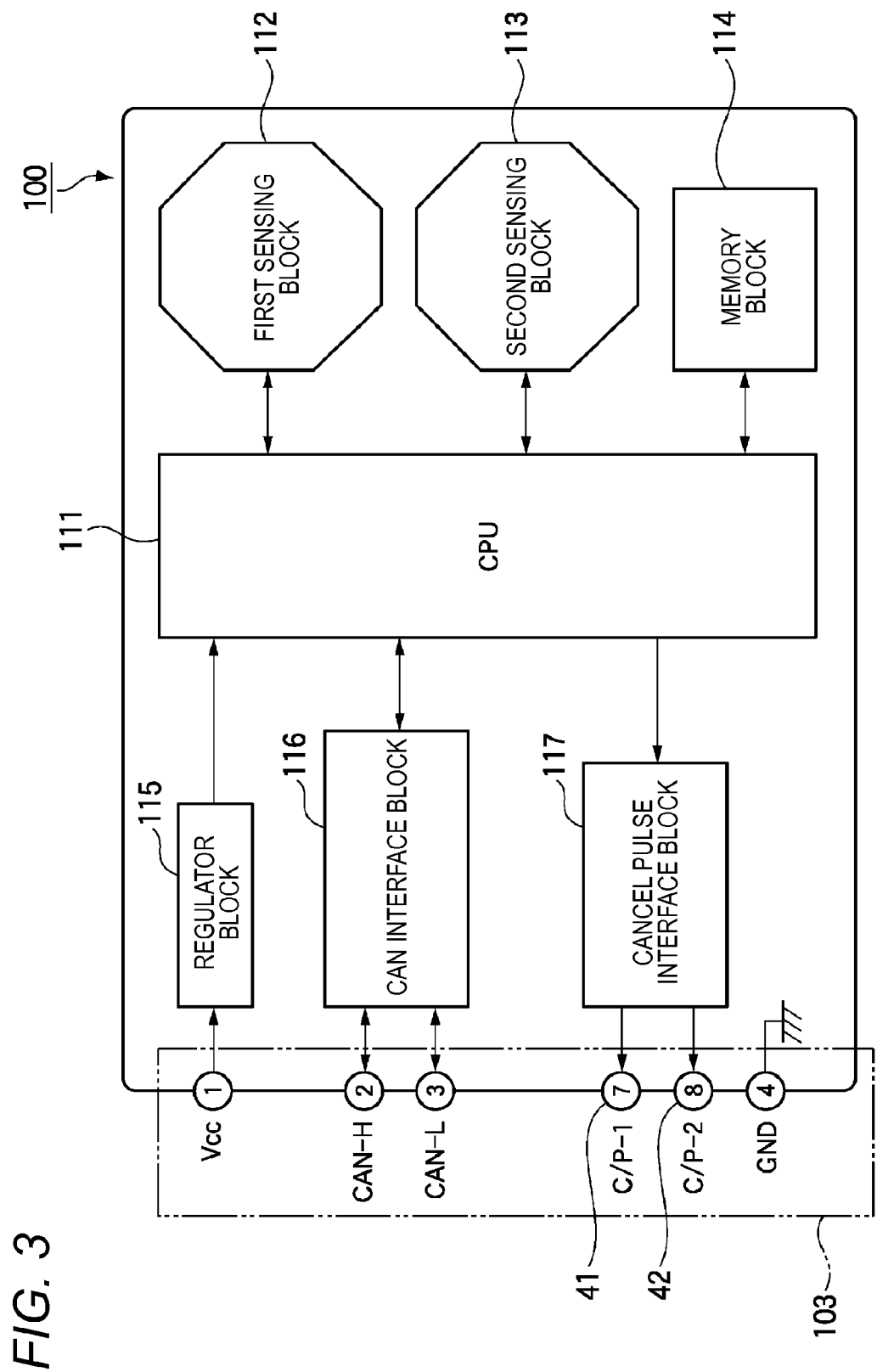
FIG. 3 is a block diagram illustrating a configuration of an actual electric circuit in the turn cancel signal output device shown in FIG. 2.

An actual configuration of an electric circuit in the turn cancel signal output device 100 shown in FIG. 2 is shown in FIG. 3. As shown in FIG. 3, the following blocks 111 to 117 are provided in the turn cancel signal output device 100 as hardware.

A microcomputer (CPU) 111 executes a program that is embedded in advance to perform a process of realizing various functions necessary in the turn cancel signal output device 100. For example, respective functions of the turning angle calculator 12, the steering angular velocity detector 25, the first cancel pulse generator 21, and the second cancel pulse generator 22 shown in FIG. 1 are realized by the microcomputer 111. These functions may be realized by dedicated hardware other than a microcomputer.

A first sensing block 112 and a second sensing block 113 correspond to the sensor block 11 shown in FIG. 1, and may detect the rotation amount or rotation angle of the steering wheel. That is, the rotation amount or rotation angle of the rotating shaft disposed in the opening portion 102 shown in FIG. 2 is detected by the first sensing block 112 and the second sensing block 113.

A memory block 114 is a non-volatile memory unit capable of reading and rewriting of data, and is configured by an EEPROM, for example. The memory block 114 may retain a program executed by the microcomputer 111 or data such as constants. The memory block 114 includes the function of the non-volatile memory 30 shown in FIG. 1.

A regulator block 115 converts a direct current power supplied from the vehicle to a power line (Vcc, GND) of the connector 103 into a stable direct current power, and supplies the output to each circuit of the microcomputer 111 or the like.

A CAN interface block 116 performs signal processing according to a communication standard of a controller area network (CAN), and enables communication connection between the on-vehicle communication network (CAN) and the turn cancel signal output device 100. The CAN interface block 116 is connected to the on-vehicle communication network (CAN) through a signal line (CAN-H, CAN-L) provided as each terminal of the connector 103. Accordingly, various on-vehicle electronic control units (ECU) may access the turn cancel signal output device 100 through the on-vehicle communication network.

A cancel pulse interface block 117 performs signal processing for outputting the above-described first cancel pulse C/P-1 and the second cancel pulse C/P-2 as signals of predetermined signal levels. Functions of the first cancel pulse generator 21 and the second cancel pulse generator 22 shown in FIG. 1 may be embedded inside the cancel pulse interface block 117 as dedicated hardware.

<Description of Specific Operation of Turn Cancel Signal Output Device 100>

<C/P-1 Generation Operation>

Figure 4:
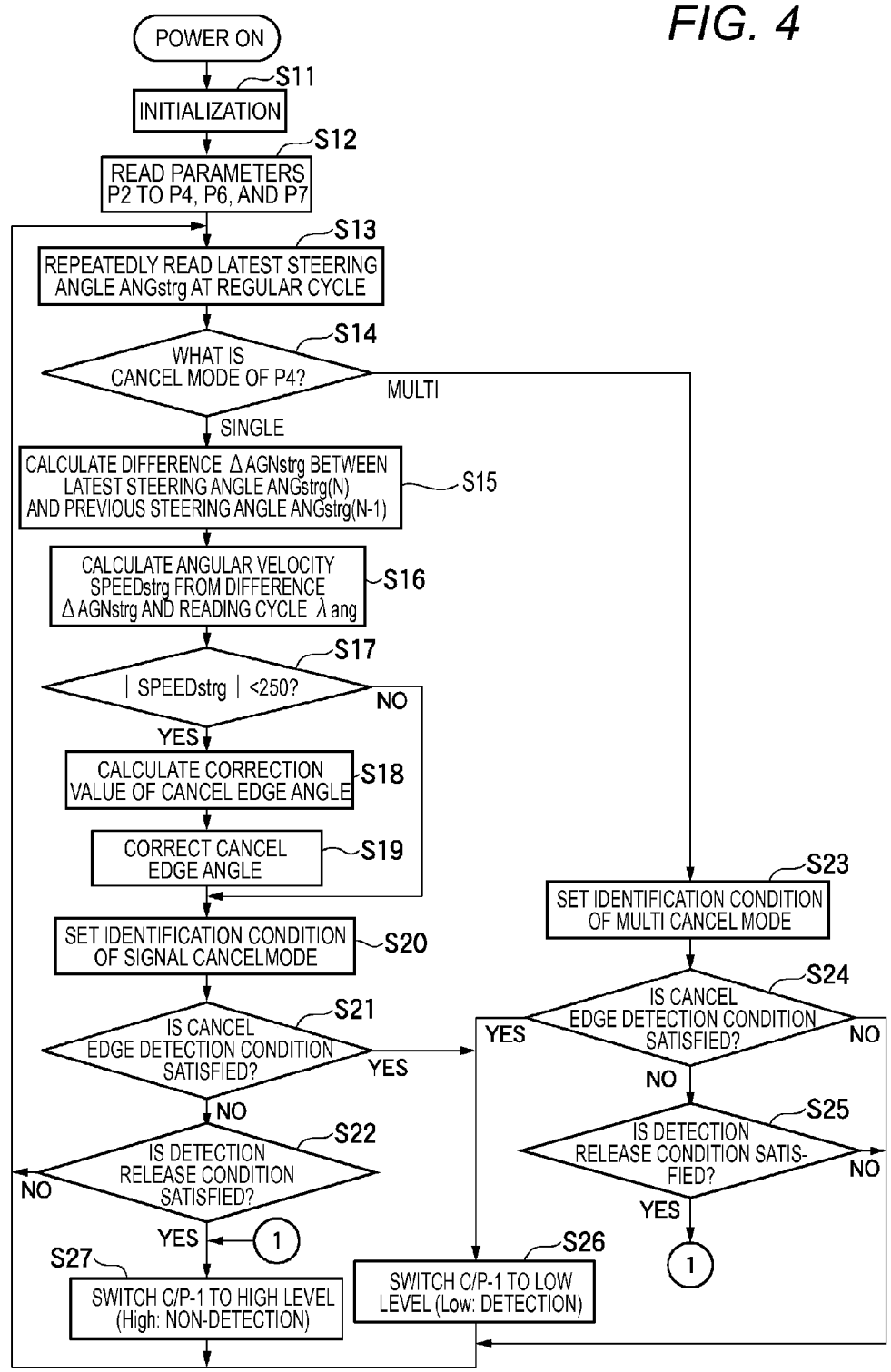
FIG. 4 is a flowchart illustrating an operation of generating a first cancel pulse C/P-1.

An operation of generating the first cancel pulse C/P-1 is shown in FIG. 4. That is, the microcomputer 111 shown in FIG. 3 executes a process shown in FIG. 4 to realize the function of the first cancel pulse generator 21 shown in FIG. 1, so that the first cancel pulse C/P-1 is generated. The operation of FIG. 4 will be described below.

When electric power is supplied, the microcomputer 111 executes predetermined initialization in step S11, and then, reads data on the parameters P2 to P4, P6, and P7 from the non-volatile memory 30 in the next step S12.

In step S13, the microcomputer 111 periodically reads information on the latest angle ANGstrg from the output of the steering angle detector 10 or as data on the memory block 114.

In step S14, the microcomputer 111 identifies whether a currently designated turn cancel mode is a single mode or a multi mode, with reference to the parameter P4 read in step S12. In the case of the single cancel mode, the procedure progresses to step S15, and in the case of the multi cancel mode, the procedure progresses to step S23.

In step S15, the microcomputer 111 calculates a difference ΔANGstrg between a latest steering angle ANGstrg(N) and a previously acquired steering angle ANGstrg(N−1). Further, in step S16, the microcomputer 111 calculates a steering angular speed SPEEDstrg based on the difference ΔAANGstrg calculated in S15 and a reading cycle λang of the steering angle ANGstrg.

In step S17, the microcomputer 111 compares an absolute value of the steering angular velocity SPEEDstrg calculated in S16 with a threshold value (250[°/sec]). The threshold value represents an upper limit of a range where a cancel edge angle is to be corrected according to the steering angular velocity. When a condition of "|SPEEDstrg|<250" is satisfied, since it is necessary to correct the cancel edge angle, the procedure progresses to S18, and when the condition is not satisfied, since it is not necessary to correct the cancel edge angle, the procedure progresses to S20.

In step S18, the microcomputer 111 calculates a correction value (offset_ANG_CE) of the cancel edge angle depending on the steering angular velocity by the following expression.

Correction value (offset_ANG_CE)=*P*7−{*P*2−
(|SPEEDstrg|×*P*6)}

That is, the correction is performed depending on a multiplication result of the steering angular velocity (SPEEDstrg) and the perception delay time (parameter P6). Further, the correction value is determined in consideration of the cancel target angle (parameter P7) so that the turn cancel signal is reliably generated before the rotational position of the steering wheel returns to a perfect neutral position (angle 0).

In step S19, the microcomputer 111 corrects the cancel edge angle value (P2) using the correction value calculated in S18. That is, calculation of the following expression is performed.

Cancel edge angle value after correction=*P*2 before correction+correction value (offset_ANG_CE)

In step S20, the microcomputer 111 specifies an identification condition of C/P-1 in the single cancel mode as follows.

Condition of switching C/P-1 to low level (Low) (cancel edge detection condition): |ANGstrg|≤P2

Condition of switching C/P-1 to high level (High) (detection release condition): |ANGstrg|≥(P2+P3)

Condition of maintaining level of C/P-1: when both of the above-mentioned two conditions are not satisfied In step S21, the microcomputer 111 identifies whether the cancel edge detection condition specified in S20 is satisfied, and when the condition is satisfied, the procedure progresses to S26, and when the condition is not satisfied, the procedure progresses to S22.

In step S22, the microcomputer 111 identifies whether the detection release condition specified in S20 is satisfied, and when the condition is satisfied, the procedure progresses to S27, and when the condition is not satisfied, the procedure progresses to S13.

In step S23, the microcomputer 111 specifies the identification condition of the C/P-1 in the multi cancel mode as follows.

Condition of switching C/P-1 to low level (Low) (cancel edge detection condition): (|ANGstrg|−360×n)≤P2

Condition of switching C/P-1 to high level (High) (detection release condition): (|ANGstrg|−360×n)≥(P2+P3)

Condition of maintaining level of C/P-1: when both of the above-mentioned two conditions are not satisfied Here, the value n is as follows:
n=2 when|ANGstrg|≥540[°]
n=1 when|ANGstrg|≥180[°]
n=0 when|ANGstrg|<180[°]

In step S24, the microcomputer 111 identifies whether the cancel edge detection condition specified in S23 is satisfied, and then the condition is satisfied, the procedure progresses to S26, and when the condition is not satisfied, the procedure progresses to S25.

In step S25, the microcomputer 111 identifies whether the detection release condition specified in S23 is satisfied, and then the condition is satisfied, the procedure progresses to S27, and when the condition is not satisfied, the procedure progresses to S13.

In step S26, the microcomputer 111 switches an electric potential of the output first cancel pulse C/P-1 to a low level (Low: for example, an electric potential close to GND).

In step S27, the microcomputer 111 switches an electric potential of the output first cancel pulse C/P-1 to a high level (High: for example, an electric potential close to Vcc).

When both of steps S26 and S27 are not executed, the electric potential of the first cancel pulse C/P-1 is maintained at the same electric potential as the electric potential before steps S26 and S27.

<C/P-2 Generation Operation>

Figure 5:
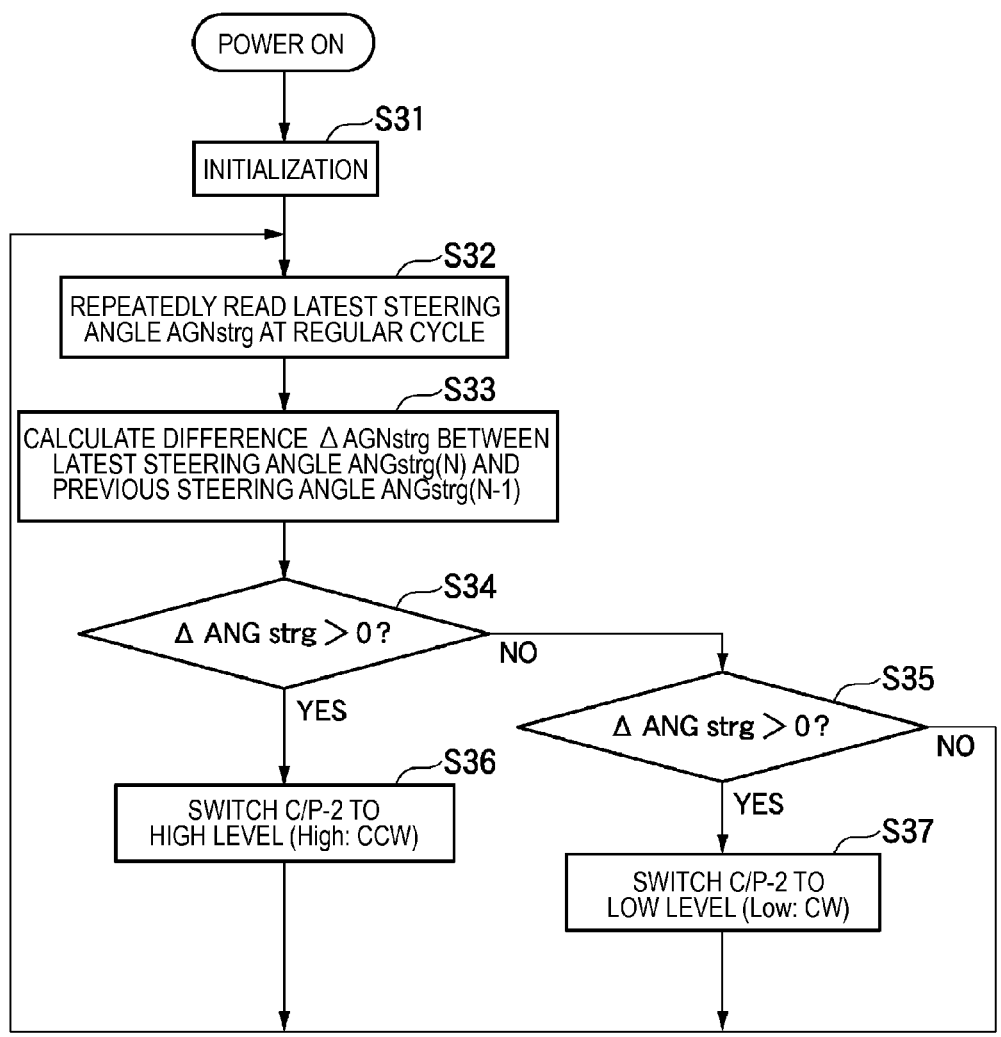
FIG. 5 is a flowchart illustrating an operation of generating a second cancel pulse C/P-2.

An operation of generating the second cancel pulse C/P-2 is shown in FIG. 5. That is, the microcomputer 111 shown in FIG. 3 executes a process shown in FIG. 5 to realize the function of the second cancel pulse generator 22 shown in FIG. 1, so that the second cancel pulse C/P-2 is generated. The operation of FIG. 5 will be described below.

When electric power is supplied, the microcomputer 111 executes predetermined initialization in step S31, and then, the procedure progresses to step S32.

In step S32, the microcomputer 111 periodically reads information on a latest angle ANGstrg from the output of the steering angle detector 10 or as data on the memory block 114. Further, the microcomputer 111 temporarily retains information on steering angles ANGstrg acquired in the previous two processes, sets a latest steering angle read in an N-th process as ANGstrg(N), and sets a previous steering angle read in an (N−1)-th process before one cycle as ANGstrg(N−1).

In step S33, the microcomputer 111 performs calculation of the following expression using the information on the steering angles acquired in the previous two processes of S32 to calculate a difference (change) ΔANGstrg of the steering angles.

ΔANGstrg=ANGstrg(N)−ANGstrg(N−1)

In step S34, the microcomputer 111 identifies whether the condition of "ΔANGstrg>0" is satisfied. When the condition is satisfied, the procedure progresses to S36, and when the condition is not satisfied, the procedure progresses to S35.

In step S35, the microcomputer 111 identifies whether the condition of "ΔANGstrg<0" is satisfied. When the condition is satisfied, the procedure progresses to S37, and when the condition is not satisfied, the procedure progresses to S32.

In step S36, the microcomputer 111 switches an electric potential of the second cancel pulse C/P-2 to a high level (High: for example, an electric potential close to Vcc). This state represents that the rotation direction of the steering shaft is counterclockwise (CCW).

In step S37, the microcomputer 111 switches an electric potential of the second cancel pulse C/P-2 to a low level (Low: for example, an electric potential close to GND). This state represents that the rotation direction of the steering wheel is clockwise (CW).

<Specific Example of Operation Characteristic>
<Operation When Correction Depending on Steering Angular Velocity is Not Performed>

Figure 6:
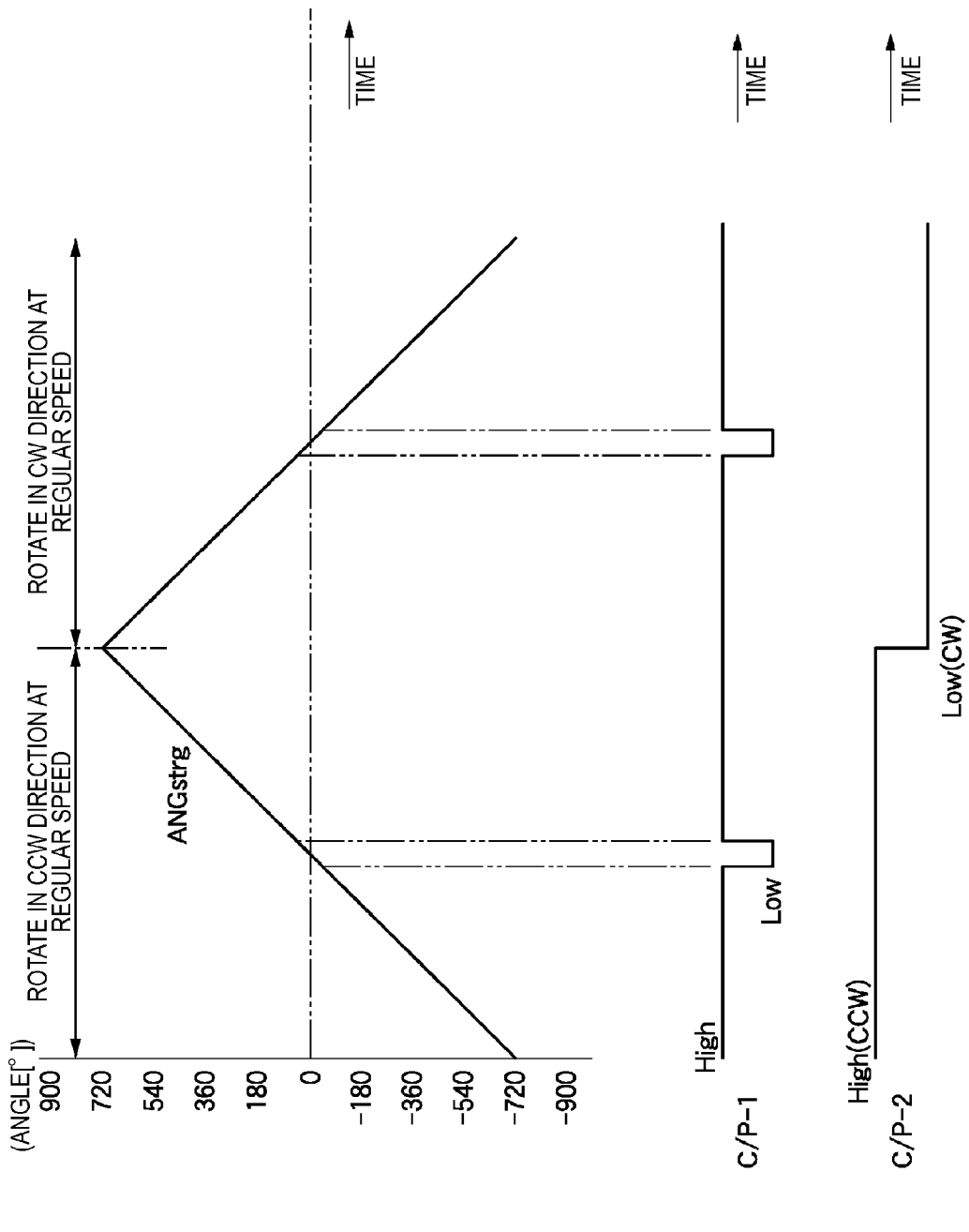
FIG. 6 is a timing chart illustrating a specific example (1) of an operation characteristic of a turn cancel signal output device.
Figure 7:
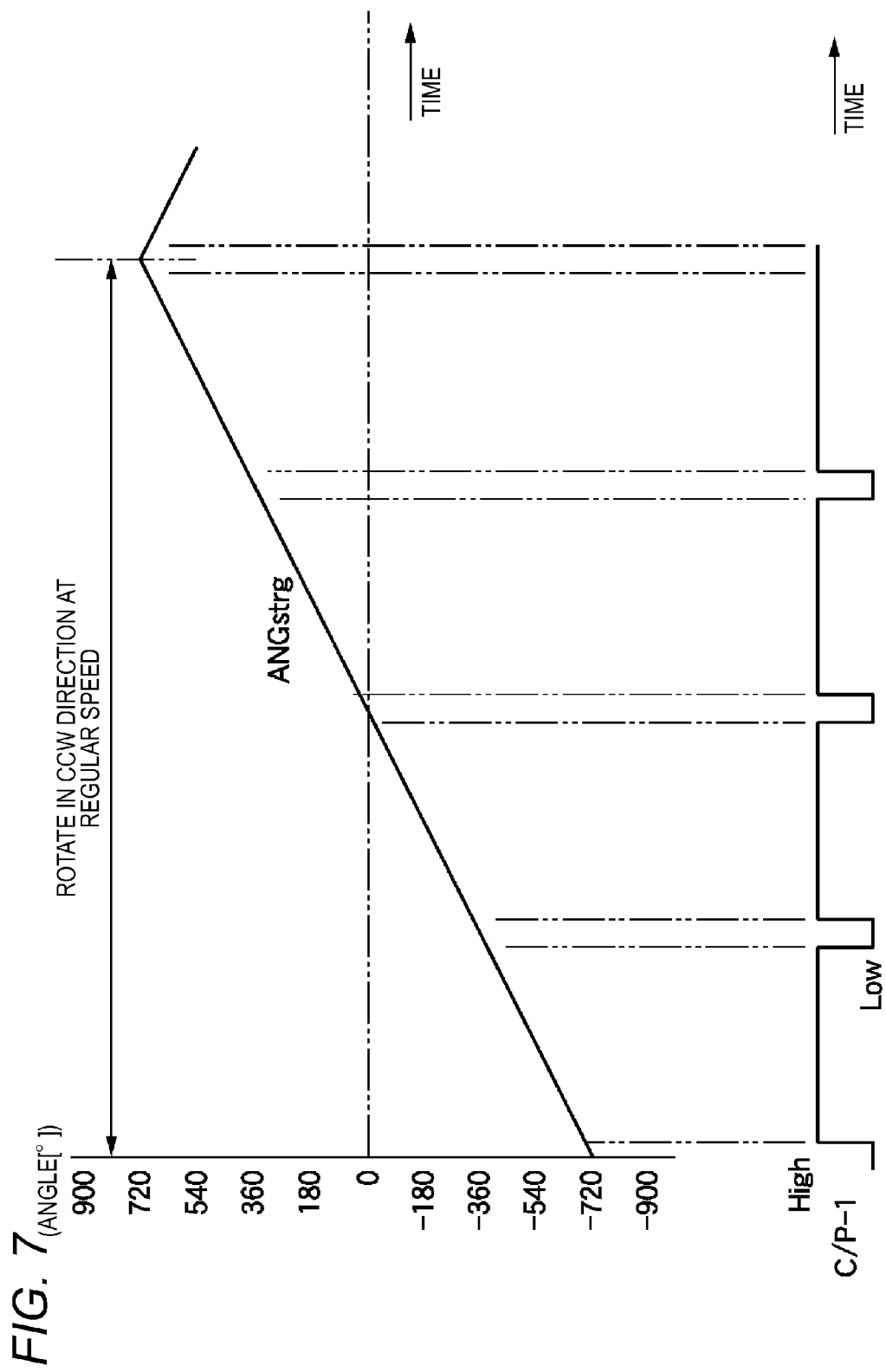
FIG. 7 is a timing chart illustrating a specific example (2) of an operation characteristic of a turn cancel signal output device.
Figure 8:
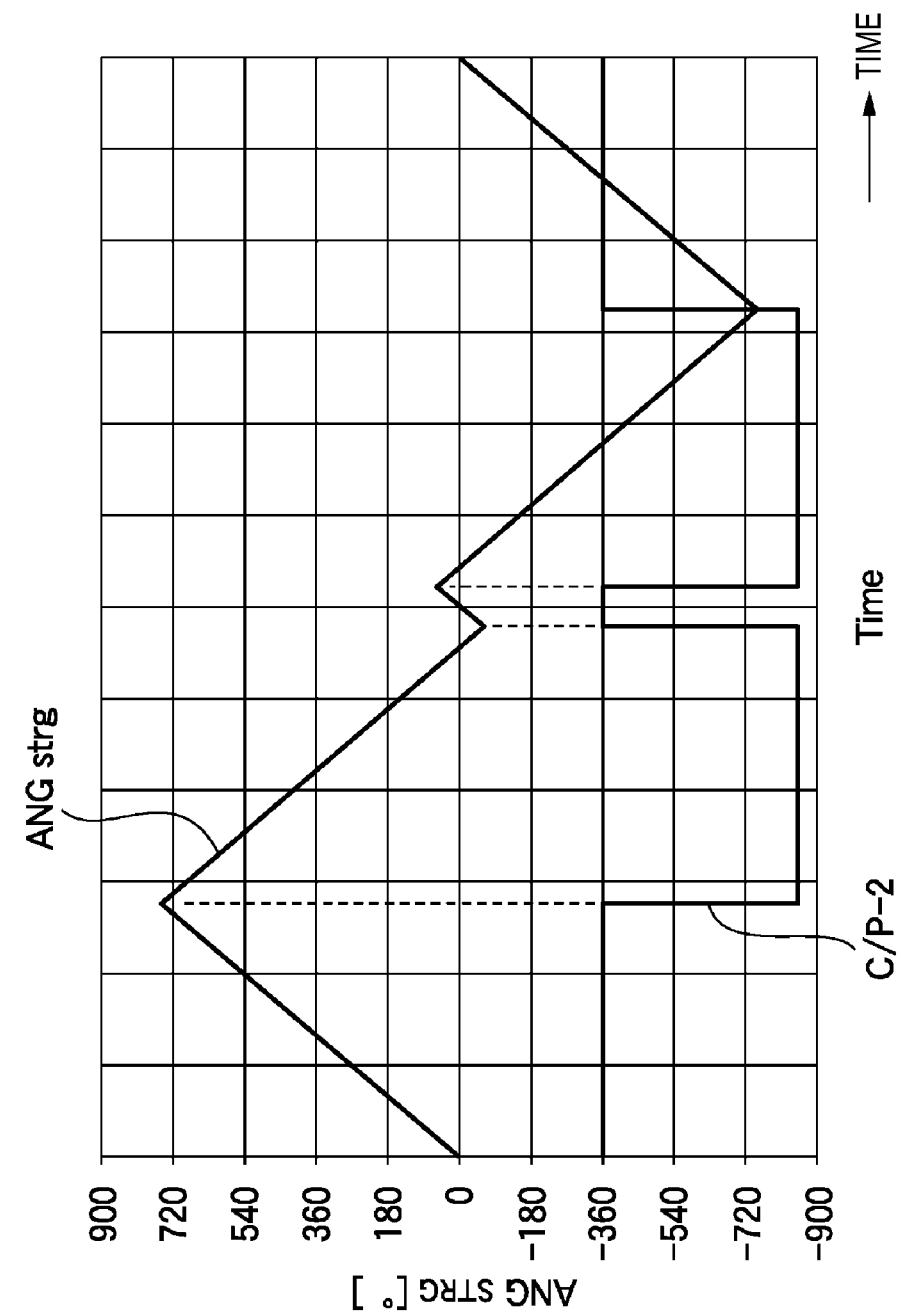
FIG. 8 is a timing chart illustrating a specific example (3) of an operation characteristic of a turn cancel signal output device.

Specific examples of an operation characteristic in the above-described turn cancel signal output device 100 are shown in FIGS. 6, 7, and 8, respectively.

The operation characteristic shown in FIG. 6 represents a situation where steering is performed in the CCW direction at a regular speed at an angle of −750° to +750° in a state where the single cancel mode is designated, and then, is reversely performed in the CW direction at a regular speed at an angle of +720° to −720°. Further, in this case, the following values are used as respective parameters.

P2: 30[°] (cancel edge angle value)
P3: 2[°] (hysteresis angle value)
P4: single cancel mode As shown in FIG. 6, in the case of the single cancel mode, only one effective pulse (Low section) appears as the first cancel pulse C/P-1, with respect to one-time steering in the entire steerable range of −750° to +750°.

That is, when the steering angle ANGstrg satisfies the cancel edge detection condition of S21 in FIG. 4 (|ANGstrg|≤P2), C/P-1 is switched to "Low" in S26. Further, immediately thereafter, when the detection release condition in S22 is satisfied (|ANGstrg|≥(P2+P3), C/P-1 is switched to "High" in S26.

On the other hand, the operation characteristic shown in FIG. 7 represents a situation where the steering is performed in the CCW direction at a regular speed at an angle of −750° to +750° in a state where the multi cancel mode is designated. Further, in this case, the following values are used as respective parameters.

P2: 30[°] (cancel edge angle value)
P3: 2[°] (hysteresis angle value)
P4: multi cancel mode As shown in FIG. 7, in the case of the multi cancel mode, whenever the steering shaft and the steering wheel rotate one turn (rotation of 360°), when the cancel edge condition is satisfied, an effective pulse (Low section) appears as the first cancel pulse C/P-1.

That is, when the steering angle ANGstrg satisfies the cancel edge detection condition of S24 in FIG. 4 ((|ANGstrg|−360×n)≤P2), C/P-1 is switched to "Low" in S26. Further, immediately thereafter, when the detection release condition in S25 is satisfied (|ANGstrg|−360×n)(P2+P3), C/P-1 is switched to "High" in S27.

Further, the operation characteristic shown in FIG. 8 represents a change state of the second cancel pulse C/P-2 when a change of the rotation direction is given to the movement of the steering wheel. That is, in the example shown in FIG. 8, the following steering is assumed.

(1) Initial Rotation in the CCW direction in a steering angle range of 0[°] to +750[°]
(2) Subsequent rotation in the CW direction in a steering angle range of +750[°] to −60[°]
(3) Subsequent rotation in the CCW direction in a steering angle range of −60[°] to +60[°]
(4) Subsequent rotation in the CW direction in a steering angle range of +60[°] to −750[°]
(5) Subsequent rotation in the CCW direction in a steering angle range of −750[°] to 0[°]

As shown in FIG. 8, the second cancel pulse C/P-2 is switched to the high level (High) when the rotation direction where the steering angle ANGstrg changes is CCW, and is switched to the low level (Low) when the rotation direction is CW. That is, when the condition of S34 shown in FIG. 5 is satisfied, the rotation direction is considered as (CCW), so that C/P-2 is switched to the high level, and when the condition of S35 is satisfied, the rotation direction is considered as (CW), so that C/P-2 is switched to the low level.

<Operation of Correction Depending on Steering Angular Velocity>

Figures 12, 13:
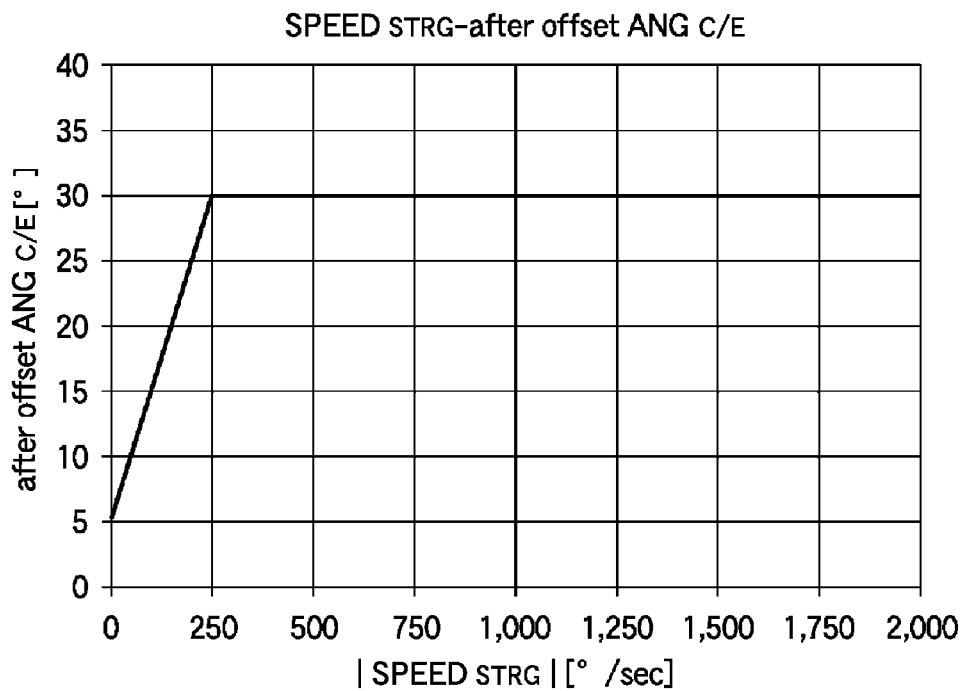
FIG. 12 is a schematic diagram illustrating a list of a correction value for each steering angular velocity and cancel edge angles before and after correction.
FIG. 13 is a graph illustrating the relationship between a steering angular velocity and a cancel edge angle after correction.

A list of a correction value for each steering angular velocity (SPEEDstrg) and cancel edge angles before and after correction is shown in FIG. 12. Further, the relationship between the steering angular velocity and the cancel edge angle after correction is shown in FIG. 13. Further, the relationship between a detected steering angle and C/P-1 under six types of conditions is shown in FIG. 14.

Figure 14:
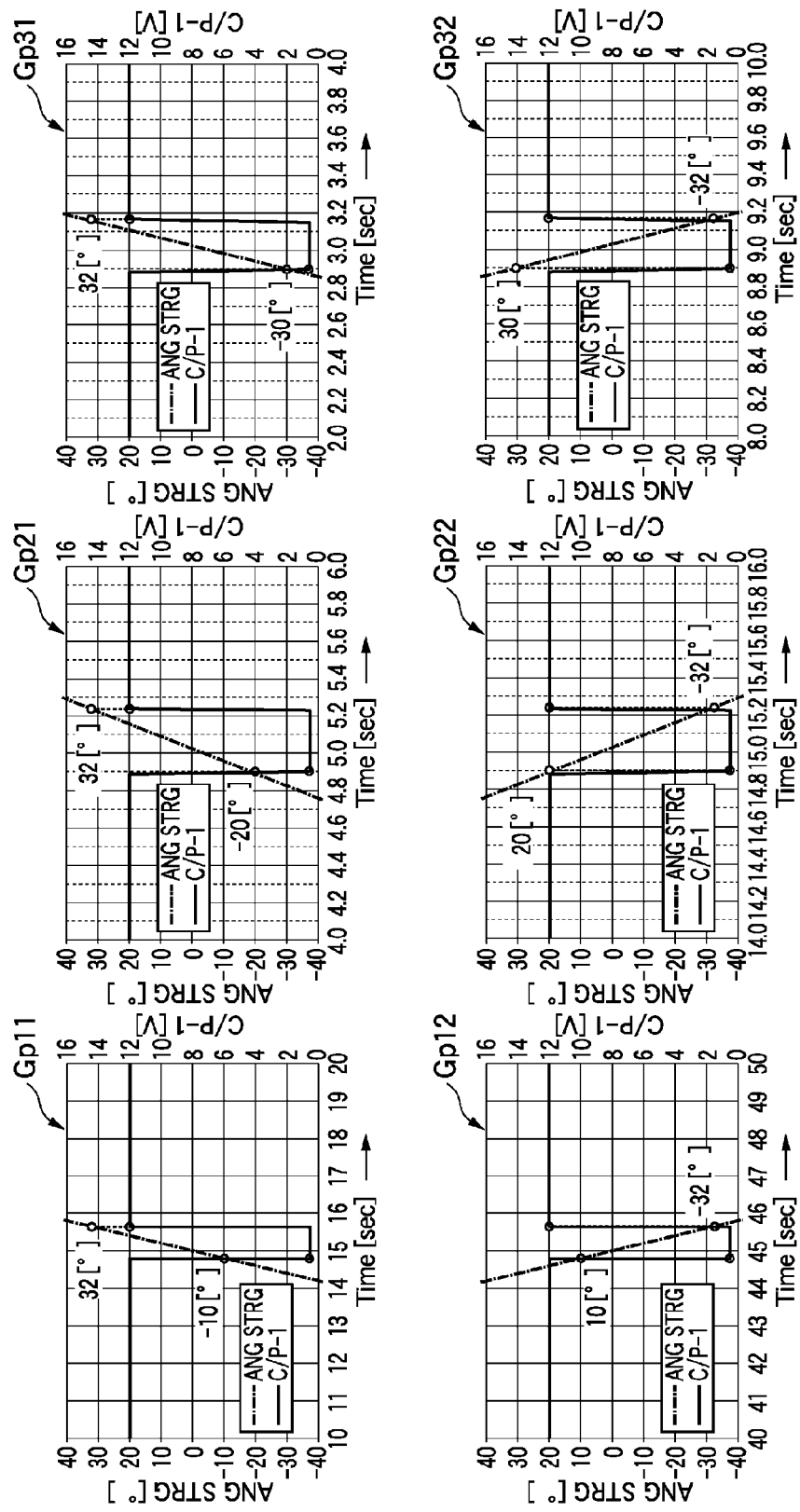
FIG. 14 is a timing chart illustrating the relationship between a detected steering angle and C/P-1 under six types of conditions.

In the examples shown in FIGS. 12, 13, and 14, the following situation is assumed as the above-described parameters and other conditions.

P2: 30[°] (cancel edge angle value: ANG C/E)
P3: 2[°] (hysteresis angle value)
P4: single cancel mode
P6: 0.1 [sec] (perception delay time: TIME-P/D)
P7: 5[°] (cancel target angle: ANGc/t)
Range of steering angular velocity at which correction is performed: −250[°/sec] to +250[°/sec]

As shown in FIG. 12, a cancel edge angle value ANG C/E before correction (before offset) is a value of the parameter P2, that is, 30[°]. Further, a correction value (offset value) of ANG C/E shown in FIG. 12 is calculated by the following expression in step S18 in FIG. 4.

$$\text{Correction value (offset value)} = P7 - \{P2 - (|\text{SPEEDstrg}| \times P6)\} \quad (1)$$

Further, a cancel edge angle value ANG C/E after correction (after offset) shown in FIG. 12 is calculated as a result obtained by adding the correction value (offset value) to P2 before correction in S19 in FIG. 4.

For example, when the steering angular velocity (SPEEDstrg) is 50[°/sec], the correction value (offset value) calculated from the expression (1) becomes −20[°], and the cancel edge angle value ANG C/E after correction (after offset) becomes 10[°]. Further, when the steering angular velocity is 150[°/sec], the correction value (offset value) becomes −10[°], and the cancel edge angle value after correction (after offset) (ANG C/E) becomes 20[°]. When the steering angular velocity is 250[°/sec], the correction value (offset value) becomes 0[°], and the cancel edge angle value after correction (after offset) (ANG C/E) becomes 30[°]. That is, the result is as shown in FIG. 12.

Further, since the range of the steering angular velocity where the correction is performed is determined as "−250[°/sec] to +250[°/sec]", the relationship between the steering angular velocity (SPEEDstrg) and the cancel edge angle after correction (ANG C/E) shows the characteristic as shown in FIG. 13. That is, since the compared threshold value in step S17 of FIG. 4 is 250[°/sec], the correction is performed in a range where the absolute value of the steering angular velocity (SPEEDstrg) is equal to or smaller than 250.

Further, as shown in FIG. 13, a minimum value of the cancel edge angle (ANG C/E) after correction is 5[°]. The minimum value may be regulated by the value of the parameter P7. That is, even when the steering angular velocity is extremely small, the driver can reliably output the turn cancel signal at a time point when the driver returns the steering wheel to an angle of 5[°] before the neutral position (0[°]).

<Specific Example of Operation Timing>

Operation examples Gp11 and Gp12 shown in FIG. 14 represent operation timings under the following conditions.
Correction value of cancel edge angle (ANG C/E): −20[°]
Cancel edge angle (ANG C/E) after correction (ANG C/E): 10[°]
Rotation direction of steering wheel: Gp11 is CCW and Gp12 is CW In the operation example Gp11, when the steering angle ANGstrg comes close to the neutral position by −10[°], the first cancel pulse C/P-1 becomes Low. Further, when the steering angle ANGstrg exceeds the neutral position by +32[°], the first cancel pulse C/P-1 becomes High.

Further, in the operation example Gp12, when the steering angle ANGstrg comes close to the neutral position by +10[°], the first cancel pulse C/P-1 becomes Low. Further, when the steering angle ANGstrg exceeds the neutral position by −32[°], the first cancel pulse C/P-1 becomes High.

On the other hand, the operation examples Gp21 and Gp22 shown in FIG. 14 represent operation timings under the following conditions.
Correction value of cancel edge angle (ANG C/E): −10[°]
Cancel edge angle (ANG C/E) after correction (ANG C/E): 20[°]
Rotation direction of steering wheel: Gp21 is CCW and Gp22 is CW In the operation example Gp21, when the steering angle ANGstrg comes close to the neutral position by −20[°], the first cancel pulse C/P-1 becomes Low. Further, when the steering angle ANGstrg exceeds the neutral position by +32[°], the first cancel pulse C/P-1 becomes High.

Further, in the operation example Gp22, when the steering angle ANGstrg comes close to the neutral position by +20[°], the first cancel pulse C/P-1 becomes Low. Further, when the steering angle ANGstrg exceeds the neutral position by −32[°], the first cancel pulse C/P-1 becomes High.

On the other hand, the operation examples Gp31 and Gp32 shown in FIG. 14 represent operation timings under the following conditions.
Correction value of cancel edge angle (ANG C/E): 0[°]
Cancel edge angle (ANG C/E) after correction (ANG C/E): 30[°]
Rotation direction of steering wheel: Gp21 is CCW and Gp22 is CW In the operation example Gp31, when the steering angle ANGstrg comes close to the neutral position by −30[°], the first cancel pulse C/P-1 becomes Low. Further, when the steering angle ANGstrg exceeds the neutral position by +32[°], the first cancel pulse C/P-1 becomes High.

Further, in the operation example Gp32, when the steering angle ANGstrg comes close to the neutral position by +30[°], the first cancel pulse C/P-1 becomes Low. Further, when the steering angle ANGstrg exceeds the neutral position by −32[°], the first cancel pulse C/P-1 becomes High.

That is, as understood from differences of the operation examples Gp11, Gp21, and Gp13, the timing (steering angle ANGstrg) when the first cancel pulse C/P-1 becomes low is changed according to differences of the correction values. That is, the change of steering angular velocity is reflected to the change of the cancel edge detection timing.

<Turn Cancel Identification Example using C/P-1 and C/P-2>

In the higher electronic control unit (ECU), by using both of C/P-1 and C/P-2 output from the above-described turn cancel signal output device 100, it is possible to relatively simply perform turn cancel identification. That is, after blinking of the turn signal lamp of the turn indicator is started, the identification of turn cancel which serves as a trigger for terminating the blinking can be performed based on C/P-1 and C/P-2.

Specifically, the higher electronic control unit (ECU) performs identification using the following conditions.

<Example of Turning-Off Condition of Right Turn Signal Lamp>

Level rising (Low→High) of the first cancel pulse C/P-1 should be detected, and the rotation direction of the second cancel pulse C/P-2 should be CCW (High).

<Example of Turning-Off Condition of Left Turn Signal Lamp>

Level rising (Low→High) of the first cancel pulse C/P-1 should be detected, and the rotation direction of the second cancel pulse C/P-2 should be CW (Low).

<Specific Control Example of Turn Indicator>
<When Correction Depending on Steering Angular Velocity is not Performed>

Figure 11:
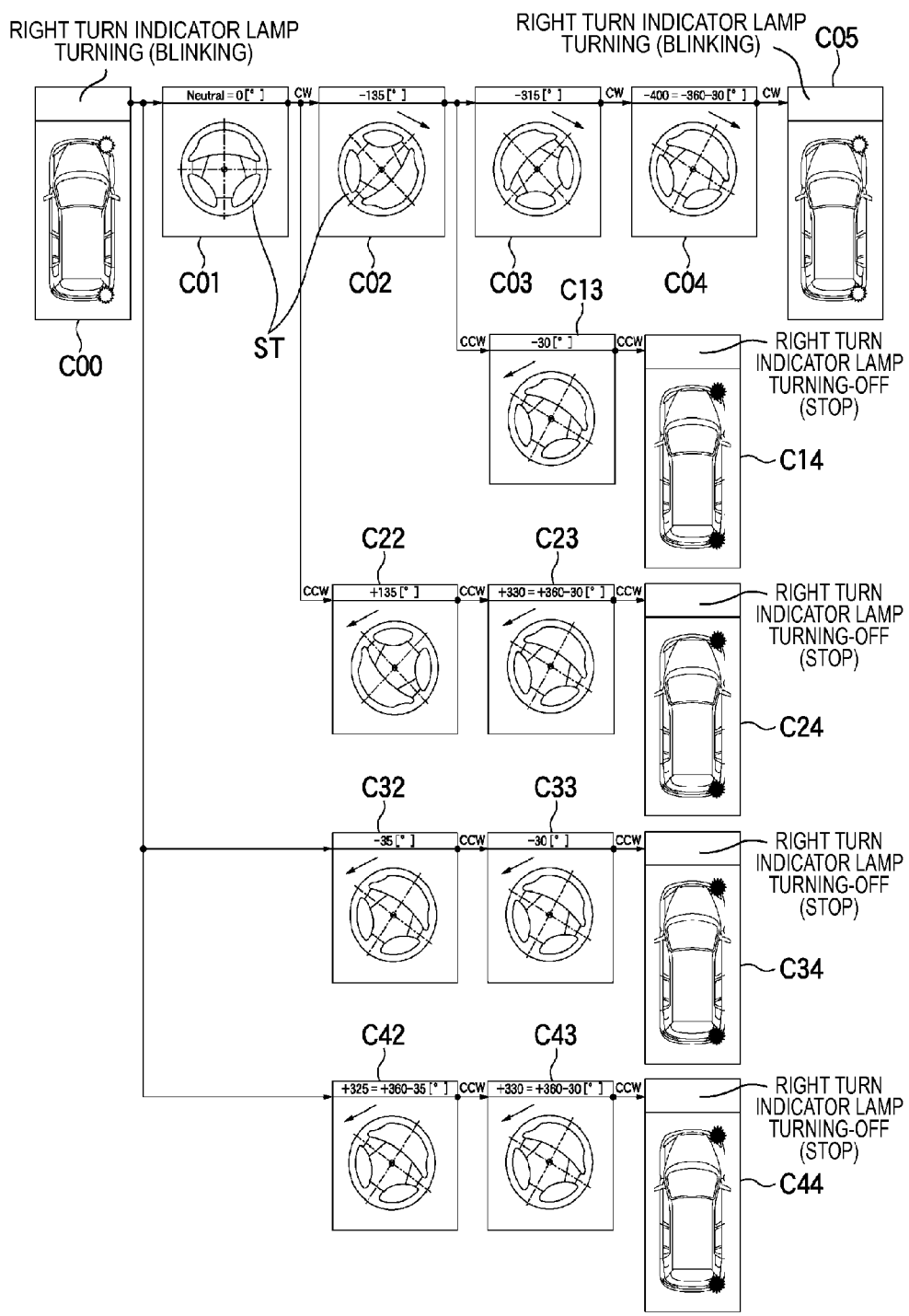
FIG. 11 is a state transition diagram illustrating a specific example of a correspondence relationship between state transition of a steering angle and a rotation direction depending on an operation of a steering wheel and control of a turn indicator lamp.

A specific example of a correspondence relationship between state transition of the steering angle and the rotation direction depending on the operation of the steering wheel and control of the turn indicator lamp is shown in FIG. 11. That is, the higher electronic control unit (ECU) controls turning-off of the turn indicator lamp (turn signal lamp) according to the state transition depending on the operation of the steering wheel, as shown in FIG. 11. In the example shown in FIG. 11, the high electronic control unit (ECU) performs control using the turning-off condition. Parameters of the turn cancel signal output device 100 to be assumed herein are as follows.

Steering angle range: −750[°] to +750[°]
P2: 30[°] (cancel edge angle value)
P3: 2[°] (hysteresis angle value)

Respective states and state transition situations shown in FIG. 11 will be described below.

If the driver operates the operation lever for turning right the vehicle, the higher electronic control unit (ECU) that controls the turn indicator lamp turns on a "right turn signal". Thus, a blinking operation of the right turn indicator lamp starts. This corresponds to an initial state COO shown in FIG. 11. Here, it is necessary to detect a turn cancel state in order to terminate the blinking of the right turn indicator lamp.

The electronic control lamp (ECU) can identify the turn cancel state based on the "right turn signal" and the C/P-1 and C/P-2 output from the turn cancel signal output device 100. In fact, respective states C05, C14, C24, C34, and C44 shown in FIG. 11 are obtained as results of the respective state transitions.

(1) As shown in FIG. 11, when the state of the steering wheel ST changes in the order of C01→C02→C03→C04 and the steering angle [°] changes in the CW direction in the order of 0 (neutral position)→"−135"→"−315"→"−400", the turn cancel state is not detected. As a result, the blinking operation of the right indictor lamp is continued in the state C05.

(2) When the steering wheel ST rotates in the CCW direction at the end of the state C02 and the steering angle [°] becomes "−30" as in state C13, the pulse C/P-1 appears to satisfy the above-mentioned "turning-off condition", and thus, the turn cancel state is detected. As a result, the right indicator lamp is turned off in the state C14.

(3) Similarly, even when the state of the steering wheel transitions in the order of C01→C22→C23, when the multi cancel mode is designated, the pulse C/P-1 appears to satisfy the above-mentioned "turning-off condition", and thus, the turn cancel state is detected. As a result, the right turn indictor lamp is turned off in the state C24.

(4) When the state of the steering wheel transitions in the order of C00→C32→C33, the pulse C/P-1 appears to satisfy the above-mentioned "turning-off condition", and thus, the turn cancel state is detected. As a result, the right turn indictor lamp is turned off in the state C34.

(5) Even when the state of the steering wheel transitions in the order of C00→C42→C43, when the multi cancel mode is designated, the pulse of the C/P-1 appears to satisfy the above-mentioned "turning-off condition", and thus, the turn cancel state is detected. As a result, the right turn indictor lamp is turned off in the state C44.

<When Correction Depending on Steering Angular Velocity is Performed>

A specific example of a correspondence relationship between state transition of the steering angle and the rotation direction depending on the operation of the steering wheel and control of the turn indicator lamp is shown in FIG. 15. That is, the higher electronic control unit (ECU) controls turning-off of the turn indicator lamp (turn signal lamp) according to the state transition depending on the operation of the steering wheel as shown in FIG. 15. In the example shown in FIG. 15, the high electronic control unit (ECU) performs control using the above-described turning-off condition. Parameters of the turn cancel signal output device 100 to be assumed herein are as follows.

P2: 30[°] (cancel edge angle value)
P3: 2[°] (hysteresis angle value)
P4: signal cancel mode
P6: 0.1 [sec] (perception delay time: TIME-P/D)
P7: 5[°] (cancel target angle: ANG c/t)
Range of steering angular velocity at which correction is performed: −250[°/sec] to +250[°/sec]

Respective states and state transition situations shown in FIG. 15 will be described.

If the driver operates the operation lever for turning right the vehicle, the higher electronic control unit (ECU) that controls the turn indicator lamp turns on the "right turn signal". Thus, the blinking operation of the right turn indicator lamp starts. This corresponds to an initial state C50 shown in FIG. 15. Here, it is necessary to detect the turn cancel state in order to terminate the blinking of the right turn indicator lamp.

The electronic control lamp (ECU) can identify the turn cancel state based on the "right turn signal" and C/P-1 and C/P-2 output from the turn cancel signal output device 100. In fact, respective states C54, C61, and C62 shown in FIG. 15 are obtained as results of the respective state transitions.

(1) As shown in FIG. 15, when the state of the steering wheel ST changes in state order of C51→C52→C53 and the steering angle [°] changes in the order of 0 (neutral position)→ "−135"→"−40", the turn cancel state is not detected. Accordingly, the blinking operation of the right indictor lamp is continued in the state C52.

(2) When the steering wheel ST is changed from state S52 to state C53 so that the steering angle [°] returns to "−30", and when the steering angular velocity is fast, the pulse C/P-1 appears to satisfy the above-mentioned "turning-off condition", and thus, the turn cancel state is detected. As a result, the light indicator lamp is turned off in the state C54. Here, the driver actually perceives the turn cancel state such as the state C54 when the perception delay time (0.1[sec]) elapses after the "turning-off condition" is satisfied in the state C53.

(3) On the other hand, when the steering angular velocity is 50[°/ sec], as shown in FIG. 12, the correction value (offset value) becomes −20[°], and the cancel edge angle value after correction becomes 10[°]. Accordingly, as in the state C61 in FIG. 15, when the angle [°] returns to "−10", the pulse C/P-1 appears to satisfy the above-mentioned "turning-off condition", and thus, the right turn indictor lamp is turned off in the state C61. Here, the driver actually perceives the turn cancel state such as the state C54 when the perception delay time (0.1 [sec]) elapses after the "turning-off condition" is satisfied in the state C61. That is, when the steering angle [°] returns to "−5" as in the state C62, the driver perceives the turning-off of the right indicator lamp as in the state C54.

(4) When the steering angular velocity is 250[°/sec], since the correction value is 0[°], when the steering angle [°] returns to "−30" as in the state C53, the pulse C/P-1 appears to satisfy the above-mentioned "turning-off condition", and thus, the right indicator lamp is turned off. Here, the driver actually perceives the turn cancel state when the perception delay time (0.1[sec]) elapses after the "turning-off condition" is satisfied in the state C53, at which the steering angle coincides with the state C62. That is, the driver perceives the turn cancel state at the same state C62 regardless of the magnitude of the steering angular velocity. Accordingly, the driver does not feel discomfort and anxiety with respect to the timing of the turn cancel.

<Self Diagnosis and Parameter Rewriting>

Figure 9:
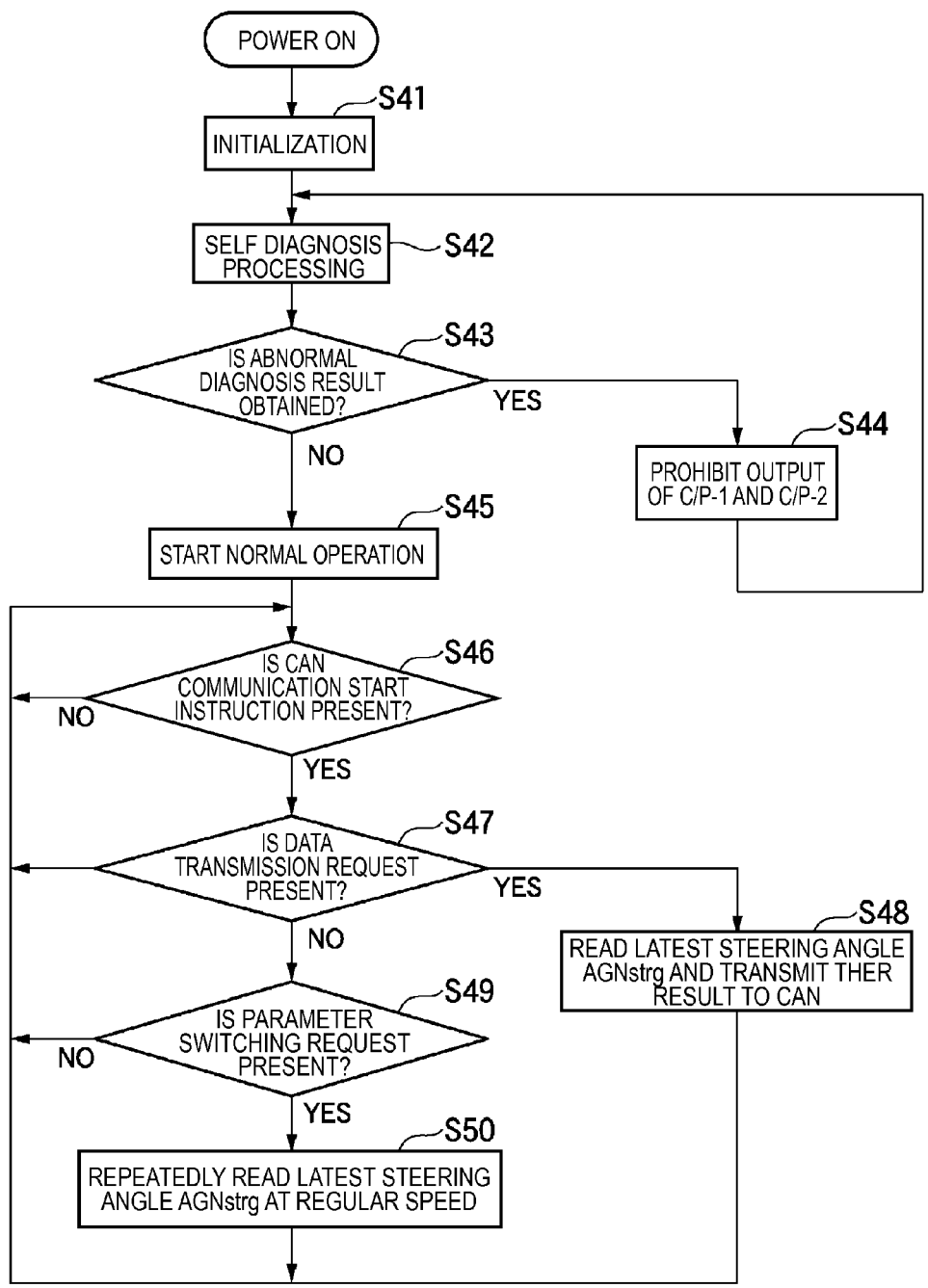
FIG. 9 is a flowchart illustrating operations of self diagnosis and parameter rewriting in a turn cancel signal output device.

Operations of self diagnosis and parameter rewriting in the turn cancel signal output device 100 are shown in FIG. 9. The microcomputer 111 (see FIG. 3) built in the turn cancel signal output device 100 executes a predetermined program, to realize the operations in FIG. 9. Processes of respective steps in FIG. 9 will be described below.

When the power supply of the turn cancel signal output device 100 is turned on, the microcomputer 111 executes predetermined initialization in step S41, and then, the procedure progresses to a process of S42.

In step S42, the microcomputer 111 executes s predetermined self diagnosis process. For example, the microcomputer 111 executes diagnosis relating to a function relating to the microcomputer 111, or diagnosis relating to disconnection of respective blocks (112, 113, 116, 117 or the like) connected to the microcomputer 111, abnormality of a signal level, or the like. Further, the microcomputer 111 also diagnoses whether a current situation is a situation where a correct steering angle can be detected.

In step S43, the microcomputer 111 identifies whether an abnormality diagnosis result is obtained as the result of S42. When the abnormality diagnosis result is detected, the procedure progresses to S44, and when the abnormality diagnosis result is not detected, the procedure progresses to S45.

In step S44, since the current situation is a situation where the correct steering angle cannot be detected, the microcomputer 111 controls the cancel pulse interface block 117 so that the output of the above-described first cancel pulse C/P-1 and second cancel pulse C/P-2 are prohibited (so that the signal level is fixed to High).

In step S45, the microcomputer 111 starts a predetermined process so that the turn cancel signal output device 100 performs a normal operation. Thus, for example, the process shown in FIG. 4 or the process shown in FIG. 5 is normally executed. Accordingly, it is possible to output the above-described first cancel output pulse C/P-1 and second cancel pulse C/P-2.

In step S46, the microcomputer 111 monitors the situation of the CAN interface block 116, to identify the presence or absence of the start of CAN communication. When the start of the CAN communication is present, the procedure progresses to S47.

In step S47, the microcomputer 111 identifies whether the CAN interface block 116 receives a command of "data transmission request" from another electronic control unit (ECU) connected to the on-vehicle communication network (CAN). When the "data transmission request" is received, the procedure progresses to S48, and the "data transmission request" is not received, the procedure progresses to S49.

In step S48, the microcomputer 111 reads data on the latest steering angle ANGstrg detected by the steering angle detector 10, and transmits the data to the on-vehicle communication network (CAN) through the CAN interface block 116.

In step S49, the microcomputer 111 identifies whether a command of "parameter rewriting request" is received from another electronic control unit (ECU) connected to the on-vehicle communication network (CAN). When the "parameter rewriting request" is received, the procedure progresses to S50, and when the "parameter rewriting request" is not received, the procedure progresses to S46.

In step S50, the microcomputer 111 rewrites data on the parameters P2 to P4, P6, and P7 retained on the memory block 114 (non-volatile memory 30) according to the content of the received "parameter rewriting request".

<Modification Example>

Figure 10:
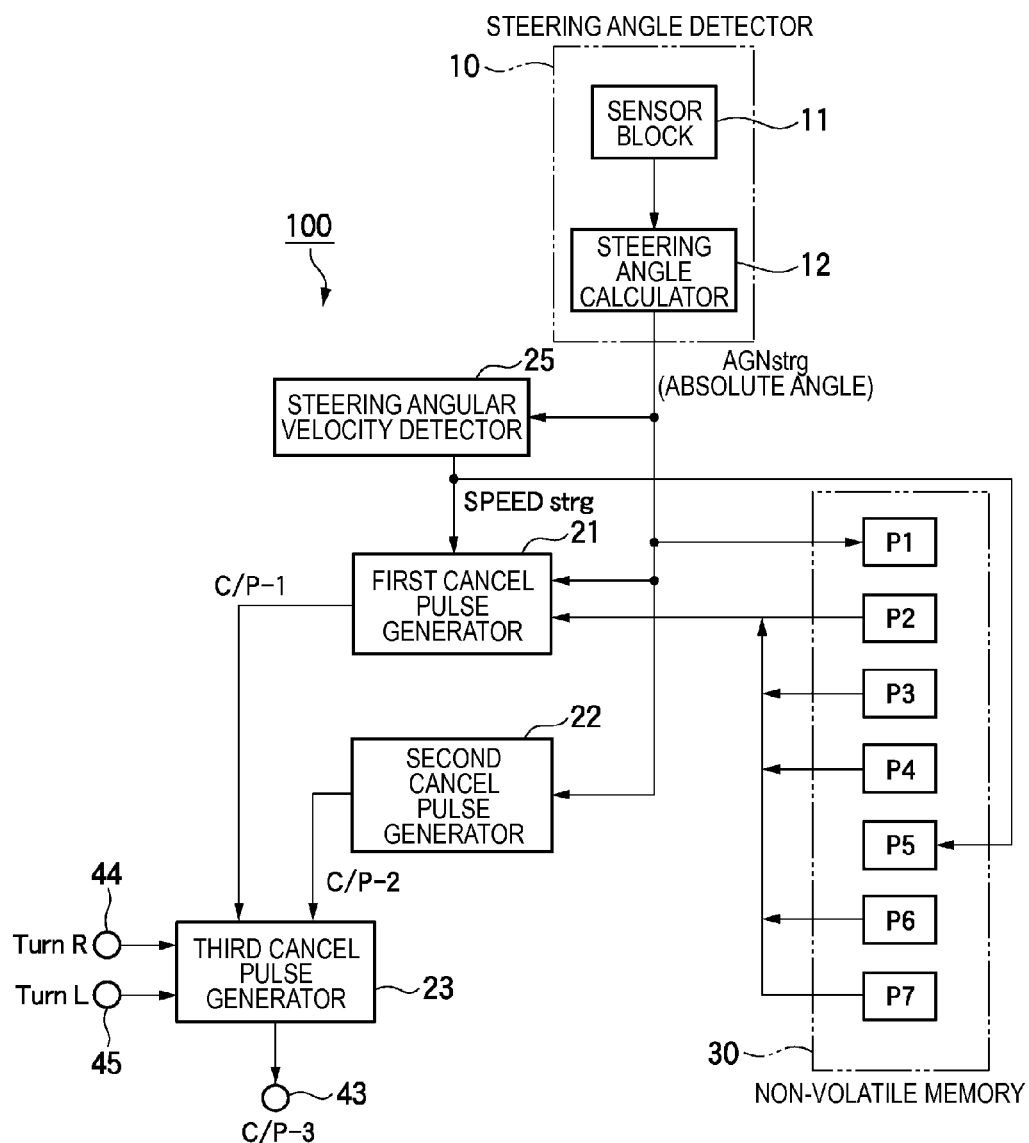
FIG. 10 is a block diagram illustrating a functional configuration of a turn cancel signal output device according to a modification example.

A functional configuration of the turn cancel signal output device 100 according to a modification example is shown in FIG. 10. The configuration shown in FIG. 10 is similar to the configuration shown in FIG. 3 in actual hardware of an electric circuit, but the number of terminals provided in the connector 103 or content of signals is changed. Further, the cancel pulse interface block 117 is also changed according to the change of signal.

As shown in FIG. 10, in the modification example, a third cancel pulse generator 23 is added as a new component. Further, the first cancel pulse C/P-1 output from the first cancel pulse generator 21 and the second cancel pulse C/P-2 output from the second cancel pulse generator 22 are input to the third cancel pulse generator 23.

Further, a right turn signal TurnR and a left turn signal TurnL are input to the third cancel pulse generator 23 through input terminals 44 and 45 that are newly provided in the connector 103.

The right turn signal TurnR and the left turn signal TurnL represent current turn indicator states, and are output from a higher electronic control unit (ECU). The right turn signal TurnR is in an ON state (for example, Low level) in a control state where the right turn indicator lamp blinks (state where the vehicle turns right). Similarly, the left turn signal TurnL is in an ON state in a control state where the left turn indicator lamp blinks (state where the vehicle turns left).

The third cancel pulse generator 23 generates a third cancel pulse C/P-3 based on the input signals (C/P-1, C/P-2, TurnR, and TurnL). The third cancel pulse C/P-3 is output to an output terminal 43. The output terminal 43 and the input terminals 44 and 45 are disposed on the connector 103.

Accordingly, when the turn cancel signal output device 100 of the modification example shown in FIG. 10 is used, the higher electronic control unit (ECU) can output the right turn signal TurnR and the left turn signal TurnL, to thereby input the third cancel pulse C/P-3.

The third cancel pulse C/P-3 is a signal capable of being used as a trigger for terminating the blinking of the right and left turn indicator lamps. That is, in a situation where the right turn indicator lamp blinks, the higher electronic control unit (ECU) may terminate the blinking of the right turn indicator lamp when the pulse C/P-3 appears. Further, in a state where the left turn indicator lamp blinks, the higher electronic control unit (ECU) may terminate the blinking of the left turn indicator lamp when the pulse C/P-3 appears.

The third cancel pulse generator 23 may generate the third cancel pulse C/P-3 according to the following conditions.

When the right turn signal TurnR is in the ON state, when a condition that level rising (Low→High) of the first cancel pulse C/P-1 is detected and the rotation direction of the second cancel pulse C/P-2 is CCW (High) is satisfied, one effective pulse is output as C/P-3, or a signal level indicating the turn cancel is output.

When the left turn signal TurnL is in the ON state, when a condition that level rising (Low→High) of the first cancel pulse C/P-1 is detected and the rotation direction of the second cancel pulse C/P-2 is CW (Low) is satisfied, one effective pulse is output as C/P-3, or a signal level indicating the turn cancel is output.

Here, characteristics of the above-described embodiments of the vehicle turn cancel signal output device according to the invention are briefly expressed in the following (1) to (5), respectively.

(1) As shown in FIG. 1, the vehicle turn cancel signal output device (100) generates a turn cancel signal for giving a trigger for releasing an operation state of a turn indicator mounted on a vehicle based on an operation state of a steering wheel of the vehicle. Further, the vehicle turn cancel signal output device (100) includes a steering angle detector (10) that detects a steering angle of the steering wheel; a steering angular velocity detector (25) that detects a steering angular velocity based on the detected steering angle; a first cancel pulse generator (21) that generates a first cancel pulse when the steering angle reaches a target edge steering angle to be detected as an edge indicating termination of turning of the vehicle, based on the steering angle detected by the steering angle detector, and corrects the target edge steering angle according to the magnitude of the steering angular velocity; a second cancel pulse generator (22) that generates a second cancel pulse indicating a rotation direction of steering based on the steering angle detected by the steering angle detector; and signal output terminals (41 and 42) that output a signal in which the state of at least one of the first cancel pulse and the second cancel pulse is reflected.

(2) Further, as shown in FIG. 1, the vehicle turn cancel signal output device (100) further includes a memory (non-volatile memory 30) that retains information on at least one parameter (P2 to P4, P6, and P7) that affects a condition of generating the first cancel pulse.

(3) Further, the memory (non-volatile memory 30) retains a first parameter (P2) indicating a reference value of the target edge steering angle for generating the first cancel pulse, and a second parameter (P6) indicating a perception delay time, and the first cancel pulse generator (21) corrects the target edge steering angle using a multiplication result of the detected steering angular velocity and the second parameter (S18 and S19).

(4) Further, the first cancel pulse generator (21) performs the correction (S18 and S19) of the target edge steering angle depending on the steering angular velocity when an absolute value of the steering angular velocity is within a predetermined threshold value (S17).

(5) Further, the memory (non-volatile memory 30) further retains a third parameter (P7) indicating a minimum value of the target edge steering angle, and the first cancel pulse generator maintains the absolute value of the target edge steering angle after correction to be equal to or larger than a value of the third parameter (S18 and S19).

The invention has been described in detail with reference specific embodiments, but it is obvious for those skilled in the art that various changes or modifications may be made without departing from the spirit and scope of the invention.

This application is based on and claims the benefit of priority of Japanese Patent Application No. 2012-283569, filed Dec. 26, 2012, the content of which is incorporated herein by reference.

INDUSTRIAL APPLICABILITY

According to the invention, it is possible to simplify a process to be performed for recognition of appropriate turn cancel by a higher electronic control unit (ECU) that controls a turn signal lamp or the like. The invention having such an effect is useful in the field of a vehicle turn cancel signal output device that generates a turn cancel signal.

REFERENCE SIGNS LIST

10 STEERING ANGLE DETECTOR
11 SENSOR BLOCK
12 STEERING ANGLE CALCULATOR
21 FIRST CANCEL PULSE GENERATOR
22 SECOND CANCEL PULSE GENERATOR
23 THIRD CANCEL PULSE GENERATOR
25 STEERING ANGULAR VELOCITY DETECTOR
30 NON-VOLATILE MEMORY
41, 42, 43 OUTPUT TERMINAL
44, 45 INPUT TERMINAL
100 TURN CANCEL SIGNAL OUTPUT DEVICE
101 HOUSING
102 OPENING PORTION
103 CONNECTOR
111 MICROCOMPUTER
112 FIRST SENSING BLOCK
113 SECOND SENSING BLOCK
114 MEMORY BLOCK
115 REGULATOR BLOCK
116 CAN INTERFACE BLOCK

117 CANCEL PULSE INTERFACE BLOCK
C/P-1 FIRST CANCEL PULSE
C/P-2 SECOND CANCEL PULSE
C/P-3 THIRD CANCEL PULSE
P1, P2, P3, P4, P5, P5, P6, P7 PARAMETER
TurnR RIGHT TURN SIGNAL
TurnL LEFT TURN SIGNAL

The invention claimed is:

1. A vehicle turn cancel signal output device that generates a turn cancel signal for giving a trigger for releasing an operation state of a turn indicator mounted on a vehicle based on an operation state of a steering wheel of the vehicle, comprising:
 a steering angle detector configured to detect a steering angle of the steering wheel;
 a steering angular velocity detector configured to detect a steering angular velocity based on the detected steering angle;
 a first cancel pulse generator device configured to generate a first cancel pulse when the steering angle reaches a target edge steering angle to be detected as an edge indicating termination of turning of the vehicle, based on the steering angle detected by the steering angle detector, and configured to correct the target edge steering angle according to the magnitude of the steering angular velocity;
 a second cancel pulse generator device configured to generate a second cancel pulse indicating a rotation direction of steering based on the steering angle detected by the steering angle detector; and
 a signal output terminal configured to output a signal in which at least one of a state of the first cancel pulse and a state of the second cancel pulse is reflected.

2. The vehicle turn cancel signal output device according to claim 1, further comprising:
 a memory device configured to retain information on at least one parameter that affects a condition of generating the first cancel pulse.

3. The vehicle turn cancel signal output device according to claim 2,
 wherein the memory device retains a first parameter indicating a reference value of the target edge steering angle for generating the first cancel pulse and a second parameter indicating a perception delay time, and
 the first cancel pulse generator device corrects the target edge steering angle using a multiplication result of the detected steering angular velocity and the second parameter.

4. The vehicle turn cancel signal output device according to claim 3,
 wherein the first cancel pulse generator device performs the correction of the target edge steering angle depending on the steering angular velocity when an absolute value of the steering angular velocity is within a predetermined threshold value.

* * * * *